United States Patent
Koziol et al.

(10) Patent No.: US 9,520,213 B2
(45) Date of Patent: Dec. 13, 2016

(54) MATERIALS AND METHODS FOR INSULATION OF CONDUCTING FIBRES, AND INSULATED PRODUCTS

(71) Applicant: Cambridge Enterprise Limited, Cambridge, Cambridgeshire (GB)

(72) Inventors: Krzysztof K. K. Koziol, Cambridgeshire (GB); Agnieszka Ewa Lekawa-Raus, Naleczow (PL); Lukasz Kurzepa, Krasniczyn, woj.Lubelskie (PL); Xiaoyu Peng, Cambridgeshire (GB)

(73) Assignee: CAMBRIDGE ENTERPRISE LIMITED, Cambridge (GB)

( * ) Notice: Subject to any disclaimer, the term of this patent is extended or adjusted under 35 U.S.C. 154(b) by 0 days.

(21) Appl. No.: 14/346,535

(22) PCT Filed: Sep. 27, 2012

(86) PCT No.: PCT/GB2012/052403
§ 371 (c)(1),
(2) Date: Mar. 21, 2014

(87) PCT Pub. No.: WO2013/045936
PCT Pub. Date: Apr. 4, 2013

(65) Prior Publication Data
US 2014/0231118 A1    Aug. 21, 2014

(30) Foreign Application Priority Data

Sep. 27, 2011  (GB) .................................. 116670.9

(51) Int. Cl.
*H01B 7/00* (2006.01)
*H01B 13/06* (2006.01)
(Continued)

(52) U.S. Cl.
CPC ............... *H01B 13/06* (2013.01); *B82Y 30/00* (2013.01); *B82Y 40/00* (2013.01); *C01B 31/0253* (2013.01);
(Continued)

(58) Field of Classification Search
USPC ............... 174/110 R, 110 A–110 PM, 120 R, 120 SR, 174/121 R, 121 AR, 121 SR
See application file for complete search history.

(56) References Cited

U.S. PATENT DOCUMENTS

| 7,750,240 B2 * | 7/2010 | Jiang | H01B 13/0162 174/102 R |
| 2004/0020681 A1 * | 2/2004 | Hjortstam | B82Y 30/00 174/102 SC |

(Continued)

FOREIGN PATENT DOCUMENTS

| EP | 2085979 | 8/2009 |
| WO | WO 01/75902 | 10/2001 |

(Continued)

OTHER PUBLICATIONS

Koziol (2006) University of Cambridge, Extract from PhD Thesis (Chapter 5 (part)) "Polymer impregnation into arrays of carbon nanotubes: a route to the fabrication of composites".

(Continued)

*Primary Examiner* — William H Mayo, III
(74) *Attorney, Agent, or Firm* — Swanson & Bratschun, L.L.C.

(57) ABSTRACT

An electrical conductor which has an electrically conducting fiber including carbon nanotubes and/or a graphene nanoribbon and a layer of insulating material coated around the electrically conducting fiber. The insulating material substantially does not penetrate the electrically conducting fiber, or penetrates the electrically conducting fiber only to a depth (Continued)

that leaves a continuous conductive path along a remaining part of the electrically conducting fiber.

20 Claims, 21 Drawing Sheets

(51) Int. Cl.
    *H01B 1/04* (2006.01)
    *C01B 31/02* (2006.01)
    *B82Y 30/00* (2011.01)
    *H01B 7/02* (2006.01)
    *H01B 3/28* (2006.01)
    *H01B 3/44* (2006.01)
    *H01B 3/46* (2006.01)
    *B82Y 40/00* (2011.01)
    *B82Y 99/00* (2011.01)

(52) U.S. Cl.
    CPC *H01B 1/04* (2013.01); *H01B 3/28* (2013.01); *H01B 3/441* (2013.01); *H01B 3/46* (2013.01); *H01B 7/02* (2013.01); *B82Y 99/00* (2013.01); *Y10S 977/742* (2013.01)

(56) References Cited

U.S. PATENT DOCUMENTS

| | | |
|---|---|---|
| 2005/0064647 A1 | 3/2005 | Manabe |
| 2007/0151744 A1* | 7/2007 | Chen .................. H01B 1/04 174/110 R |
| 2008/0254675 A1 | 10/2008 | Lee |
| 2009/0176093 A1 | 7/2009 | Appel |
| 2009/0194313 A1 | 8/2009 | Jiang |

FOREIGN PATENT DOCUMENTS

| | | | |
|---|---|---|---|
| WO | WO2006/132881 A * | 12/2006 | ............. H01B 11/00 |
| WO | WO 2009/137722 | 11/2009 | |
| WO | WO2009/137722 A1 * | 11/2009 | ............... H01B 7/00 |
| WO | WO 2011/005964 | 1/2011 | |

OTHER PUBLICATIONS

Van Noorden (2011) Nature 14:14-16, "The Trials of New Carbon".
Patel-Predd (2008) IEEE Spectrum 45:14, "Carbon-Nanotube Wiring Gets Real".
Hikata (2008) Sei Technical Review 66:81-84, "Development of New Carbon Nanotube Production Technique Carbon Transmission Method".
Elcock (2007) Environmental Science Division, Argonne National Laboratory, ANL/EVS/TM08-3, "Potential Impacts of Nanotechnology on Energy Transmission Applications Needs".
Collins & Avouris (2000) Scientific American 62-69, "Nanotubes for Electronics".
Koziol, et al. (2007) Science 318:1892-1895, "High-Performance Carbon Nanotube Fiber".
Popov (2004) Material Science and Engineering R 43:61-102, "Carbon nanotubes: properties and application".
Dresselhaus, et al. (2004) Phil. Trans.R. Soc.Lond. A 362:2065-2098, "Electronic, thermal and mechanical properties of carbon nanotubes".
Sundaram, et al. (2011) Advanced Materials 23:5064-5068, "Continuous Direct Spinning of Fiber of SingleWalled Carbon Nanotubes with Metallic Chirality".
Harutyunyan, et al. (2009) Science 326:116-120, "Preferential Growth of Single-Walled Carbon Nanotubes with Metallic Conductivity".
Materials Science (2011) Nature 469:7329, "Spinning Yarns of Nanotubes".
Lima, et al. (2011) Science 331:51-55, "Biscrolling Nanotube Sheets and Functional Guests into Yarns".
Xu & Gao (2011) Nature Communications, "Graphene Chiral Liquid Crystals and Macroscopic Assembled Fibres".

* cited by examiner

MATERIALS AND METHODS FOR INSULATION OF CONDUCTING FIBRES, AND INSULATED PRODUCTS

RELATED APPLICATIONS

This application is a 35 U.S.C. §371 national phase application of PCT/GB2012/052403 (WO 2013/045936), filed on Sep. 27, 2012, entitled " Materials and Methods for Insulation of Conducting Fibres, and Insulated Products", which application claims the benefit of GB Application Serial No. 1116670.9, filed Sep. 27, 2011, which is incorporated herein by reference in its entirety.

FIELD OF INVENTION

The present invention relates to electrical conductors comprising electrically conducting fibres comprising carbon nanotubes, and in particular to methods of insulating electrically conducting fibres comprising carbon nanotubes and/or graphene nanoribbons, and insulated electrically conducting fibres comprising carbon nanotubes.

BACKGROUND

New generation electrical wiring is expected to be based on carbon nanotube materials [1-5]. Carbon nanotube wiring systems have the potential to provide extremely high electrical and thermal conductivity combined with superior mechanical strength and low weight [6-8]. Furthermore, carbon nanotube wires have the advantage of functioning and achieving very high electrical performance at room temperature.

However, insulation of these new generation conductors will be important for their utility in real-world electrical and electronic devices.

Due for example to the substantially different morphology (intrinsic structure), physical assembly in macroscopic structures and chemical properties of carbon nanotube materials compared with traditional metal conductors, and the fact that carbon nanotube materials may be of a much smaller size than traditional metal conductors, conventional techniques for insulation are typically unsuitable. To the best of the present inventors' knowledge, no feasible proposals have yet been made for suitable methods for insulating carbon nanotube wires. Similar problems are encountered with conducting materials comprising graphene nanoribbons.

There remains a need for suitable materials and methods for insulating conducting carbon materials comprising carbon nanotubes and/or other conducting carbon nanostructures such as graphene nanoribbons.

SUMMARY OF INVENTION

The present inventors have devised the present invention in order to reduce or overcome one or more of the above problems. In particular, the present inventors have found that when applying insulating coatings to conducting fibres comprising carbon nanostructures such as carbon nanotubes, infiltration of the fibre by the insulating material can cause significant reduction in conductivity. For example, infiltration of insulating material e.g. into voids surrounding the carbon nanotubes, carbon nanotube bundles and/or junctions between the carbon nanotubes can significantly affect the conductivity of the fibre.

Accordingly, in a first preferred aspect, the present invention provides an electrical conductor comprising
  an electrically conducting fibre comprising carbon nanotubes and/or graphene nanoribbons; and
  a layer of insulating material coated around the electrically conducting fibre,
wherein the insulating material substantially does not penetrate the electrically conducting fibre, or penetrates the electrically conducting fibre only to a depth that leaves a continuous conductive path along a remaining part of the electrically conducting fibre.

In a second preferred aspect, the present invention provides a method of coating an electrically conducting fibre comprising carbon nanotubes and/or graphene nanoribbons, the method comprising
  (i) applying a flowable insulating material to the electrically conducting fibre; and
  (ii) solidifying said insulating material on the surface of the electrically conducting fibre to coat the fibre with a layer of insulating material,
wherein the insulating material substantially does not penetrate the electrically conducting fibre, or penetrates the electrically conducting fibre only to a depth that leaves a continuous conductive path along a remaining part of the electrically conducting fibre.

The present inventors have found that the insulated electrical conductor of the present invention is suitable for incorporation into electrical and electronic devices. Accordingly, in a third preferred aspect, the present invention provides an electrical or electronic device comprising one or more electrical conductors of the present invention. For example, the electrical conductor may form part of an electrical circuit.

The electrical conductor may, for example, be provided in the form of an electrical cable, an electrical interconnect or an electrical wire. The diameter of the electrical conductor is not particularly limited in the present invention, but will typically be determined by the application to which the component will be put, taking into account the required current carrying capacity for that application. The electrical conductor is preferably to be used at or near ambient temperature, but this is not essential.

The electrical conductor may be used in a range of electrical applications. The electrical conductor may be used in a power transmission cable. The electrical conductor may be used in a lightning protection system. Alternatively, the electrical conductor may be used in general electrical wiring applications, e.g. to replace conventional copper wiring. In a preferred embodiment, the electrical conductor may be used as the current-carrying windings of an electromagnet, for example in a solenoid or more preferably in an electric motor or electric generator. The combination of properties of the preferred electrical conductors (high current density, high strength, low density) are particularly well suited to the manufacture of small size and/or low weight electric motors. In another application, the electrical conductor may be used in data transmission wiring.

It will be understood that any aspect of the invention may be combined with any other aspect, unless the context demands otherwise. Any of the preferred or optional features of any aspect may be combined, either singly or in combination, with any aspect of the invention, unless the context demands otherwise. Where a series of end points for a particular range is given, it is to be understood that any one of those end points can be applied independently to the invention.

BRIEF DESCRIPTION OF THE DRAWINGS

Preferred embodiments of the invention, further preferred and/or optional features, and examples illustrating the invention will now be set out with reference to the accompanying drawings in which.

DETAILED DESCRIPTION

Figure 1:
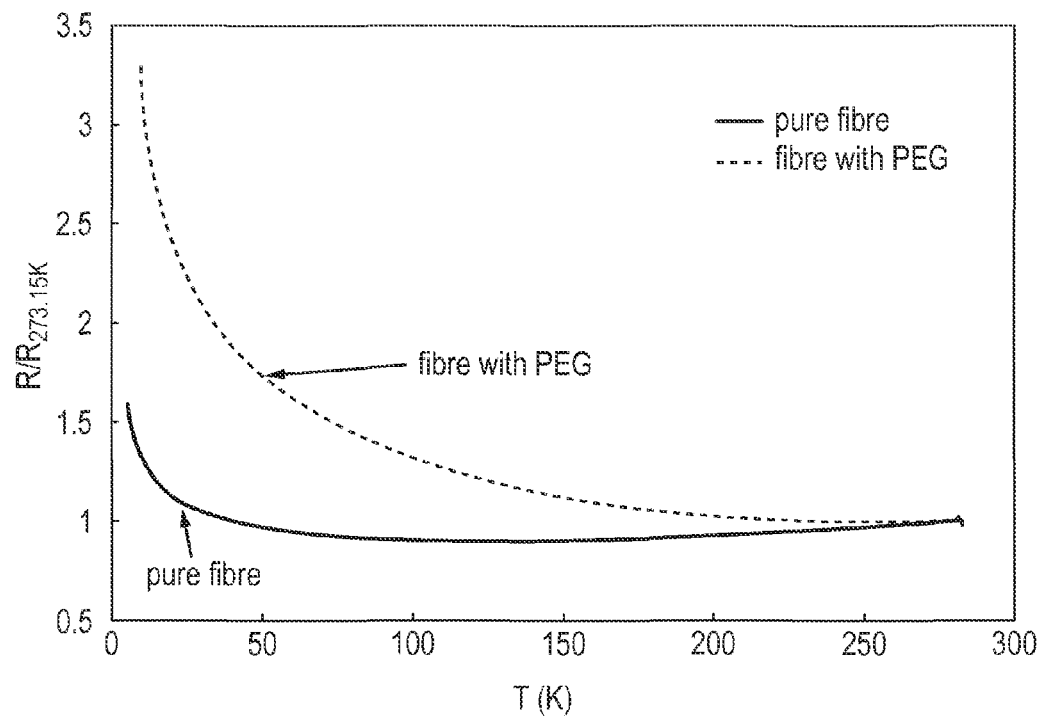
FIG. 1 shows relative changes of resistance and electrical behaviour as a function on temperature of an as-made and PEG impregnated carbon nanotube sample, determined in Comparative Example 1.

Further preferred and/or optional features of the invention will now be set out. Any of the preferred or optional features of any aspect may be combined, either singly or in combination, with any aspect of the invention, unless the context demands otherwise.

The insulating material may be a polymeric material, as described in more detail below. In that case, the flowable insulating material applied to the electrically conducting fibre may be molten polymeric material. Solidification of the polymeric material may be, for example, by cooling the polymer to a temperature at which it is solid, and/or by curing the polymer.

Alternatively, the insulating material (e.g. polymeric insulating material) may be applied to the electrically conducting fibre from an emulsion or other suspension (e.g. colloidal suspension) of insulating material in water. The present inventors have found that the insulating material phase of such an emulsion or other suspension is readily deposited on the surface of the fibre, to form a layer of insulating material. Typically, the insulating material forms the internal phase of such an emulsion or other suspension. Without wishing to be bound by theory, this deposition of insulating material is believed to occur because the carbon nanotubes are highly hydrophobic. It is believed that the emulsion itself does not significantly penetrate into the fibre, because the water is highly polar. However, the insulating material of the emulsion is readily deposited on the fibre.

After it is deposited from the emulsion or other suspension, the insulating material is solidified (e.g. by cooling and/or curing, as described above), or by removal of the water, by evaporation or otherwise. Preferably, the solidification comprises evaporation of the water.

Where the flowable insulating material is applied from an emulsion as described above, preferably the insulating material is a rubber. It may be a curing rubber or a non-curing rubber, as described below. For example, the rubber may be as a silicone rubber (e.g. polysiloxane) or latex.

The present inventors have found that where the flowable insulating material (e.g. molten polymeric material) has a high viscosity during the application step, typically the extent of penetration of the insulating material into the fibre is low. Accordingly, preferably the viscosity of the flowable insulating material during the application step is adjusted so that the insulating material substantially does not penetrate the electrically conducting fibre, or penetrates the fibre only to a depth that leaves a continuous conductive path along a remaining part of the electrically conducting fibre. This applies particularly where the flowable insulating material is, for example, molten polymeric material.

For example, during the application step (and at the temperature of the application step), the flowable insulating material may have a dynamic viscosity of at least 200 cP, more preferably at least 250 cP, at least 300 cP, at least 350 cP, at least 400 cP, at least 500 cP, at least 600 cP, at least 700 cP, at least 800 cP, or at least 900 cP. The viscosity may be as high as 1000 cP, 10000 cP, 20000 cP, 50000 cP, 100000 cP or more. As the skilled person will be aware, dynamic viscosity may be measured using a standard rheometer, such as the Rheometrics SR-200.

The present inventors have found that applying molten polymeric materials with a viscosity of 100 000 cP or more to fibres provides fibres with polymer remaining on the surface of the fibre rather than infiltrating into the fibre. However using a viscosity of 100 000 cP or more may be difficult as it involves very high shear/tensile forces between the polymeric material and the fibre and can easily deform or break the fibre during the insulation process.

Using molten polymeric materials with a viscosity significantly below 100 000 cP reduces the likelihood of the fibre being deformed or broken during the insulation process. However, using a viscosity of much less than 100 000 cP may allow the polymer/insulating melt to penetrate the fibre and interfere with the electrical properties.

The present inventors have found that increasing the density of the fibre improves the control level during the insulation process. This allows a molten polymeric compound with a lower viscosity to be used without disrupting the electrical properties of the fibre. The densification of a fibre may be achieved by any available method, including mechanical techniques like rolling twisting or wet methods such as contact with low boiling point solvent followed by a rapid evaporation process.

A typical densified fibre has a density of greater than 0.3 g/cc. Preferably the density of the fibre used is greater than 0.3 g/cc, more preferably 0.5 g/cc or more and still more preferably about 0.8 g/cc or more and more preferably still 1.0 g/cc or more. The present inventors have found that after extensive process of densification a fibre density of 1.5 g/cc or more can be achieved. The present inventors have found that using densified fibres allows the fibres to be coated with polymers/insulators with viscosities below 100 000 cP and electrical conductivity of the fibre to be retained.

If non-densified fibres are used, the density is typically 0.3 g/cc and below. The present inventors have found that fibres with a density of less than 0.3 g/cc may be affected by infiltration of polymers/insulators with viscosities below 100 k cP, in some cases fibres with a density of less than 0.3 g/cc may be completely infiltrated by polymers/insulators with viscosities below 100 000 cP.

Linear density given in a unit of tex (equaling $gkm^{-1}$) is widely used in the textile industry to give exact measurement of density of thin fibres where the precise measurement of the cross-sectional area may be unreliable. Suitably the linear density of the carbon nanotube and/or graphene nanoribbon and fibre is in the range of 0.003 to 0.1 tex. The linear density of the fibre may be measured using gravimetric method (with a balance and ruler) or a vibroscopic method applied in FAVIMAT.

For example, the linear density of a carbon nanotube fibre may be controlled between 0.03 and 0.1 tex by controlling the drawing rate of CNT aerogel from a reactor in a method such as described by Koziol et al. [17] and Sundaram et al. [12].

The length of time the fibre is exposed to the flowable insulating material before solidification is adjusted so that the insulating material substantially does not penetrate the fibre, or penetrates the fibre only to a depth that leaves a continuous conductive path along a remaining part of the electrically conducting fibre.

For example, the length of time the fibre is exposed to the flowable insulating material before solidification may be 30 minutes or less, 20 minutes or less, 10 minutes or less, 5 minutes or less, 4 minutes or less, 3 minutes or less, 2 minutes or less, 1 minute or less, 30 seconds or less, 20 seconds or less, 10 seconds or less, 5 seconds or less, or 1 second or less. Typically, the higher the viscosity, the longer the fibre may be exposed to the flowable insulating material.

In some preferred embodiments, the fibre may be immersed in a bath of flowable insulating material, e.g. drawn through a bath of flowable insulating material. For example, the fibre may be drawn through the bath by automated or manual winding. A suitable speed for drawing the fibre through the flowable insulating material (siloxane rubber) has been found to be 0.63 cm $s^{-1}$.

Suitably when the fibre is drawn through a bath of flowable insulating material and the flowable insulating material is a molten polymeric material with a viscosity of less than 100 000 cP, the mutual speed of fibre and polymer moving against each other is less than or equal to 100 m/min.

Preferably tensile forces resulting from shear forces between the fibre and polymeric material should not be higher than 0.1 GPa/SG for condensed fibres (fibres with a density of 0.3 to 1.5 g/cc) and not higher than 0.01 GPa/SG for uncondensed fibres (fibres with a density of less than 0.3 g/cc). If the tensile force for condensed fibres or uncondensed fibres exceeds these values plastic deformation of the fibre may occur which would results in permanent degradation of electrical properties of the fibre, particularly electrical conductivity.

Pressure may be applied to the bath of flowable insulating material, e.g. to pump flowable insulating material into the bath. This is particularly the case where the flowable insulating material is a rubber, such as a siloxane rubber. A suitable pumping speed has been found to be 0.33 ml $s^{-1}$.

As an alternative to controlling the density of the fibre and the viscosity of the polymeric material in order to provide an insulated fibre, it is possible to achieve well controlled and uniform insulation by using a low viscosity colloidal suspension of small polymer particles in water, e.g. latex. Due to the low viscosity of the colloidal suspension this method does not cause the problem of deformation of the fibre that may occur at high viscosities and associated high shear forces. The use of water as a suspending medium is important as it does not wet the surface of the carbon nanotubes and/or graphene nanoribbons and would not penetrate the carbon nanotubes and/or graphene nanoribbon fibres. As the fibres are hydrophobic, during the immersion stage the suspension will remain only at the fibre surface but this is enough for the polymer particles to stick to the surface of the fibre and upon drying form a proper coating layer. Additionally the present inventors have found that using a colloidal suspension not only means the coating process is easy to perform because the low viscosity of the colloidal suspension in water means that there is no practical limit to the density of the fibre to be insulated, but also the thickness of the insulation can be controlled by changing the concentration of the colloidal suspension and/or changing the number of times the immersion step is repeated. Where the electrically conducting fibre has a resistance Ro before exposure to the flowable insulating material, and a resistance of R after it has been coated with insulating material (e.g. after solidification of the insulating material), preferably the ratio R/Ro is 1.1 or less, more preferably 1.09 or less, 1.08 or less, 1.07 or less, 1.06 or less, 1.05 or less, 1.04 or less, 1.03 or less, 1.02 or less, or 1.01 or less.

As described above, the insulating material substantially does not penetrate the electrically conducting fibre, or penetrates the electrically conducting fibre only to a depth that leaves a continuous conductive path along a remaining part of the electrically conducting fibre. Preferably, the insulating material substantially does not penetrate the electrically conducting fibre.

Where the insulating material penetrates the fibre, preferably it penetrates the fibre to a depth of not more than 30% of the radius of the fibre, more preferably not more than 20%, not more than 10%, or not more than 5% of the radius of the fibre.

Where the insulating material penetrates the fibre, preferably it penetrates the fibre to a depth of not more than 5 μm from the surface of the fibre. More preferably, it penetrates to a depth of not more than 4 μm, not more than 3 μm, not more than 2 μm or not more than 1 μm.

The extent of penetration of the fibre may be determined in a variety of ways. For example, Raman mapping spectroscopy permits compositional mapping of the electrical conductor. A spot size of about 1 μm is suitable. As the skilled person will understand, mapping the intensity of G and D peaks across a cross-section of the insulated fibre would indicate whether, and to what extent, penetration of insulating material has occurred.

Alternatively, capacitance scanning microscopy may be used to determine the dielectric constant of the electrical conductor, which will indicate whether and to what extent the insulating material has infiltrated into the electrically conducting fibre.

As a further alternative, scanning electron microscopy (SEM) may be used. A contrast between void space, carbon nanotubes and insulator can be seen, and the extent of penetration can be determined visually or by image processing techniques.

Typically, a flat cross section of the electrical conductor is examined. Preferably, a focussed ion beam may be used to cut the electrical conductor to expose a cross section for examination. Where the electrical conductor is elongate in shape, e.g. a fibre, preferably the cross section is taken in a plane substantially perpendicular to the axial direction of the conductor.

From suitable SEM images (e.g. those shown in FIGS. 15, 16 and 17, the skilled person would readily be able to determine whether, and to what extent, penetration of insulating material has occurred.

A fibre of carbon nanotubes (and/or graphene nanoribbon) is not completely solid: there are typically numerous air voids between, e.g. the nanotubes and nanotube bundles. When full infiltration by the polymer has occurred, the cross sections appear continuous, and almost no voids can be seen. On the other hand when there is no infiltration the fibre clearly protrudes from the insulating material, and appears not to be connected to the insulating material. A clear boundary between fibre and insulating material is apparent. When there is partial infiltration, the cross section of the fibre is clearly seen. The fibre is held partially within the insulation (in a region extending radially inwards). A central part of the fibre, still having voids, can also be seen. At the contact area between the fibre and the insulation, it is possible to identify nanotubes pulling out of the insulation. The skilled person would be familiar with this behaviour of carbon nanomaterials such as nanotubes, and would readily be able to identify it.

Typically the electrically conducting fibre has a diameter in the range from 1 μm to 10 mm. More preferably, the fibre has a diameter up to about 1 mm, up to about 750 μm, up to about 500 μm, up to about 100 μm, up to about 50 μm or up to about 20 μm. A typical fibre diameter is 10 μm.

Optionally the diameter of the fibre is 10 μm or more.

Suitably the diameter of the electrically conducting fibre is 10 mm or less, optionally 2 mm or less, optionally 1 mm or less.

The electrically conducting fibre (and similarly the electrical conductor) preferably has at least one dimension greater than 0.01 m. The electrically conducting fibre (and similarly the electrical conductor) preferably has at least one dimension greater than 0.5 m. The fibre (and similarly the electrical conductor) may have at least one dimension greater than 1 m, 2 m, 5 m, 10 m, 15 m or 20 m. Said at least on dimension may be the length of the fibre.

Preferably, the fibre of the present invention has a conductivity of at least $0.7 \times 10^6$ S m$^{-1}$ in at least one direction (at room temperature). More preferably, it has a conductivity of at least 0.8, 0.9, 1.0, 1.1, 1.2, 1.3, 1.4, 1.5, 1.6, 1.7, 1.8, 1.9, or $2.0 \times 10^6$ S m$^{-1}$ in at least one direction (at room temperature). The conductivity may be as high as $10^7$ S m$^{-1}$ or more. It is preferred that the carbon nanotubes dominate the electrical properties of the fibre, thus providing the fibre with its electrical conductivity.

The electrically conducting fibre may allow a current density of at least 15 A mm$^{-2}$, more preferably at least 20, at least 25, at least 30, at least 35, at least 40, at least 50, at least 60 or at least 70 A mm$^{-2}$. As used herein, the term "current density" refers to the current density which can be carried by the fibre without requiring forced cooling to avoid runaway heating.

Where it includes carbon nanotubes, it will be understood that the electrically conducting fibre typically includes a very large number of carbon nanotubes. As used herein, the term "fibre" includes a single fibre (comprising a large number of carbon nanotubes), and a bundle (e.g. rope, cable, cord or yarn) comprising a plurality of individual fibres, each comprising a large number of carbon nanotubes.

Methods for continuous production of carbon materials comprising carbon nanotubes, e.g. fibres, are described in WO2008/132467, which is hereby incorporated by reference in its entirety and for all purposes, and in particular for describing methods for continuous production of carbon materials comprising carbon nanotubes.

Suitable methods for manufacturing conductive carbon nanotube materials are described in reference 12 and UK patent application number GB1018498.4, filed on 2 Nov. 2010, which are hereby incorporated by reference in their entirety for all purposes, and in particular for the purpose of describing the synthesis of conductive carbon materials comprising carbon nanotubes. Preferential growth of carbon nanotubes with metallic conductivity is also described in reference 13, which is hereby incorporated by reference in its entirety for all purposes, and in particular for the purpose of describing the synthesis of carbon nanotubes with metallic conductivity.

Preferably, the electrically conducting fibre comprises at least 75% by weight of carbon nanotubes. It may comprise at least 80%, 85%, 90%, 95%, 96%, 97%, 98% or 99% by weight of carbon nanotubes.

Suitable methods for the production of carbon materials comprising graphene nanoribbons are described in references 14, 15 and 16.

It will be understood that the conducting fibre comprising carbon nanotubes may comprise other components. For example, residual catalyst particles, such as metallic catalyst particles employed in the synthesis of the carbon nanotubes may remain in the fibre. Accordingly, the fibre may comprise a plurality of catalyst particles dispersed in the fibre. Preferably, the fibre comprises 20% by weight or less of catalyst particles, for example 15%, 10%, 5%, 4%, 3%, 2% or 1% by weight or less of catalyst particles. Non-metallic impurities may also be present.

Preferably the electrically conducting fibre comprises a dopant that increases the electrical conductivity of the fibre, e.g. water molecules.

Preferably, the electrically conducting fibre has water molecules adsorbed on its surface. It was also shown that other doping materials can be present, including iodine etc. It has been found that the addition of water vapour or iodine to the electrically conducting fibre decreases the electrical resistance of the electrically conducting fibre.

Preferably the method of coating the electrically conducting fibre is carried out in an atmosphere of 20% humidity or above.

The present inventors have found that when the flowable insulating material is a molten polymeric material and the process of application of the polymer to the electrically conducting fibre requires heating of the polymer, suitably the electrically conducting material is exposed to the molten polymer material for the shortest amount of time possible, e.g. less than 5 seconds and preferably less than 3 seconds, to limit the exposure of the electrically conducting fibre to increased temperature conditions. Limiting the exposure of the fibre to increased temperature conditions is advantageous when dopants, e.g. water molecules, are present in the fibre. Increasing the temperature of the fibre, e.g. increasing the temperature above 30° C., may cause desorption of dopants, e.g. water molecules, when present from the fibre. Removal of dopants may cause degradation of the electrical conductivity of the fibre.

Similarly, other components, such as metallic catalyst particles (e.g. in the amounts specified above) may be present in materials comprising graphene nanoribbons.

Metals, such as silver, may be incorporated into the fibre comprising carbon nanotubes and/or graphene nanoribbons. This may enhance the conducting properties of the fibre.

Where it comprises carbon nanotubes, preferably, the conducting fibre comprises predominantly single walled carbon nanotubes. For example substantially all of the carbon nanotubes may be single walled carbon nanotubes. Alternatively or additionally, the carbon nanotubes may include double-, triple- and multi-walled carbon nanotubes and mixtures thereof. Both collapsed and non-collapsed carbon nanotubes are suitable.

Where it comprises carbon nanotubes, preferably, the conducting fibre comprises predominantly metallic carbon nanotubes. For example substantially all of the carbon nanotubes may be metallic carbon nanotubes. Preferably, the conducting fibre comprises predominantly armchair carbon nanotubes, for example substantially all of the carbon nanotubes may be armchair carbon nanotubes.

The electrically conducting fibre comprising carbon nanotubes may have structural voids between individual carbon nanotubes. Alternatively, it may be substantially free of voids, and show substantially perfect packing morphology. Similarly, an electrically conducting fibre comprising graphene nanoribbons may have structural voids between individual nanoribbons. Alternatively, it may be substantially free of voids, and show substantially perfect packing morphology.

The thickness of the layer of insulating material coated on to the fibre is not particularly limited in the present invention. For example, the layer may have a thickness of about 0.25 μm, up to about 100 μm. A typical thickness is about 25 μm to 50 μm.

Preferably, the coated electrical conductor is flexible, for example such that it can be readily manipulated into a desired shape, e.g. as a current-carrying winding for an electromagnet, substantially without fracture of the insulating material.

Suitable polymers for use as the insulating material are not particularly limited. Particularly preferred polymers are low density polyethylene and rubbers (such as silicone rubbers). Silicone organic elastomer gel may also be used as a polymer. Polysiloxanes (such as alkyl polysiloxanes) are particularly suitable. For example, polydimethyl siloxane (PDMS) is particularly suitable. Other examples of particularly suitable polymers include latex rubbers, organohydrogensiloxane comprising siloxy units or organohydrogensiloxane polyoxyethylene copolymer. For example, latex rubber or silicone organic elastomer gel. Curable and non-curable polymers (e.g. curable and non-curable rubbers) are suitable.

Preferably the polymer is a non-hygroscopic polymer. An Example of a non-hygroscopic polymer is LDPE.

Optionally the insulating material comprises a curable silicone paste such as silicone organic elastomer gel.

Other particularly suitable polymers include polyethylene (such as high density polyethylene (HDPE) and ultra high molecular weight polyethylene), polyvinyl chloride (PVC), polypropylene (e.g. isotactic polypropylene), polystyrene (PS), polyvinyl acetate (PV Acetate), polymethylmethacrylate (PMMA), bisphenol A carbonate, polyethyleneimine (PEI), polyvinyl alcohol (PVA) and epoxy resin.

Of these, epoxy resin may be least preferred, since typically it has a long curing time, which can lead to infiltration of the resin into the fibre in some circumstances.

Additionally, polyethylene oxide may be suitable. Typically, polyethylene oxide has a molecular mass above about 20000 g mol$^{-1}$.

However, although the polymers listed above are particularly preferred, the nature of the polymer itself is not particularly important, provided that it is applied to the carbon material under suitable conditions (e.g. at a suitable viscosity or as an emulsion as described above), and is an insulator. It will be understood that mixtures of polymers may also be suitable. Examples of suitable polymers are provided below.

A particularly preferred subset of polymers is highlighted in the list below using two asterisks (**) to identify members of the particularly preferred subset. This subset is understood to be specifically disclosed. However, this identification of a preferred subset is not to be interpreted as limiting in any way the disclosure of other combinations or subsets of polymers form the list below.

Acrylated Olefin
Adhesive-Lined Polyolefin
Chlorinated Polyolefin
Ethylene propylene diene Monomer (M-class) rubber (EPDM Rubber)
\*\*Fluorinated Ethylene-Propylene (FEP)
\*\*Polytetrafluoroethylene (PTFE)
\*\*Flame Retarded Irradiated Polyolefin
\*\*Flame Retarded Kynar (Polyvinylidene Fluoride)
\*\*Flexible Polyolefin
\*\*Flexible, Flame Retardant, Low Shrink Temperature Polyolefin
Halogen Free Polyolefin
\*\*Highly Flexible, Flame-Retarded Polyolefin
\*\*Irradiated Polyolefin
\*\*Irradiated Polyvinyl chloride
\*\*Irradiated Silicon Rubber
\*\*Irradiated Viton
\*\*Kynar (Polyvinylidene Fluoride)
\*\*Modified Polyvinylidene Fluoride (PVDF)
\*\*Nylon
Polyester Fibres
Polyolefin
polytetrafluoroethylene (PTFE)
Radiation Cross-Linked Polyolefin
Semi Rigid, High Flame-Retarded Polyvinyl fluoride
Semi-Rigid Polyolefin
Semi-Rigid, Flame Retardant Polyolefin
Semi-Rigid, High Flame Retarded Polyolefin
Tetrafluoroethylene (TFE)
Very Flexible Polyolefin
\*\*low smoke Zero Halogen For example, it may be particularly preferred that the polymer is an unsaturated rubber (e.g. that can be cured by sulfur vulcanization), such as:
\*\*Natural polyisoprene: \*\*cis-1,4-polyisoprene natural rubber (NR) and \*\*trans-1,4-polyisoprene gutta-percha
\*\*Synthetic polyisoprene (IR for Isoprene Rubber)
\*\*Polybutadiene (BR for Butadiene Rubber)
\*\*Chloroprene rubber (CR), \*\*polychloroprene, \*\*Neoprene, \*\*Baypren etc.
\*\*Butyl rubber (copolymer of isobutylene and isoprene, IIR)
Halogenated butyl rubbers (chloro butyl rubber: CIIR; bromo butyl rubber: BIIR)
Styrene-butadiene Rubber (copolymer of styrene and butadiene, SBR)
Nitrile rubber (copolymer of butadiene and acrylonitrile, NBR), also called Buna N rubbers
Hydrogenated Nitrile Rubbers (HNBR) Therban and Zetpol For example, it may be particularly preferred that the polymer is a saturated rubber that cannot be cured by sulfur vulcanization:
EPM (ethylene propylene rubber, a copolymer of ethylene and propylene) and EPDM rubber (ethylene propylene diene rubber, a terpolymer of ethylene, propylene and a diene-component)
Epichlorohydrin rubber (ECO)
\*\*Polyacrylic rubber (ACM, ABR)
\*\*Silicone rubber (SI, Q, VMQ)
\*\*Fluorosilicone Rubber (FVMQ)
\*\*Fluoroelastomers (FKM, and FEPM)\*\*Viton, \*\*Tecnoflon, \*\*Fluorel, \*\*Aflas and \*\*Dai-El
\*\*Perfluoroelastomers (FFKM)\*\*Tecnoflon PFR, \*\*Kalrez, \*\*Chemraz, \*\*Perlast
\*\*Polyether block amides (PEBA)
Chlorosulfonated polyethylene (CSM), (Hypalon)
Ethylene-vinyl acetate (EVA)
copolymer polypropylene (PPC)
ethylene-propylene-diene (EPDM)
ethylene-propylene (EPM) rubber
Polysulfide rubber For example, it may be particularly preferred that the polymer is a fluoropolymer, such as:
\*\*PVF (polyvinylfluoride)
\*\*PVDF (polyvinylidene fluoride)
\*\*PTFE (polytetrafluoroethylene)
PCTFE (polychlorotrifluoroethylene)
PFA (perfluoroalkoxy polymer)
FEP (fluorinated ethylene-propylene)
ETFE (polyethylenetetrafluoroethylene)
ECTFE (polyethylenechlorotrifluoroethylene)
FFPM/FFKM (Perfluorinated Elastomer [Perfluoroelastomer])
FPM/FKM (Fluorocarbon [Chlorotrifluoroethylenevinylidene fluoride])
PFPE (Perfluoropolyether)
Nafion
Perfluoropolyoxetane For example, it may be particularly preferred that the polymer is a Fluoroelastomer, such as:
hexafluoropropylene (HFP)
vinylidene fluoride (VDF or VF2),
tetrafluoroethylene (TFE),
vinylidene fluoride (VDF)
hexafluoropropylene (HFP)
perfluoromethylvinylether (PMVE)
\*\*polyethylene terephthalate (PET)
\*\*thermoplastic polyurethanes Further suitable polymers include:
epoxy resin
polyoxybenzylmethylenglycolanhydride
\*\*Acrylonitrile butadiene styrene (ABS)
\*\*Acrylic polymers (e.g. polymethylmethacrylate, PMMA)
\*\*Celluloid
\*\*Cellulose acetate
Cyclic Olefin Copolymer (COC)
\*\*Ethylene-Vinyl Acetate (EVA)
\*\*Ethylene vinyl alcohol (EVOH)
\*\*Fluoroplastics (\*\*PTFE, alongside with \*\*FEP, \*\*PFA, \*\*CTFE, \*\*ECTFE, \*\*ETFE)
\*\*IonomersKydex, a trademarked acrylic/PVC alloy Liquid Crystal Polymer (LCP)
\*\*Polyoxymethylene (POM or Acetal)
\*\*Polyacrylates (Acrylic)
\*\*Polyacrylonitrile (PAN or Acrylonitrile)
\*\*Polyamide (PA or Nylon)
\*\*Polyamide-imide (PAI)
\*\*Polyaryletherketone (PAEK or Ketone)
\*\*Polybutadiene (PBD)
\*\*Polybutylene (PB)
\*\*Polybutylene terephthalate (PBT)
\*\*Polycaprolactone (PCL)
\*\*Polychlorotrifluoroethylene (PCTFE)
\*\*Polyethylene terephthalate (PET)
\*\*Polycyclohexylenedimethylene terephthalate (PCT)
\*\*Polycarbonate (PC)

\*\*Polyhydroxyalkanoates (PHAs)
\*\*Polyketone (PK) Polyester
\*\*Polyethylene (PE)
\*\*Polyetheretherketone (PEEK)
\*\*Polyetherketoneketone (PEKK)
\*\*Polyetherimide (PEI)
\*\*Polyethersulfone (PES)
\*\*Polyimide (PI)
\*\*Polylactic acid (PLA)
\*\*Polymethylpentene (PMP)
\*\*Polyphenylene oxide (PPO)
\*\*Polyphenylene sulfide (PPS)
\*\*Polyphthalamide (PPA)
\*\*Polypropylene (PP)
\*\*Polystyrene (PS)
\*\*Polysulfone (PSU)
\*\*Polytrimethylene terephthalate (PTT)
\*\*Polyvinylidene chloride (PVDC)
\*\*Styrene-acrylonitrile (SAN)
epichlorohydrin
bisphenol-A,
Polyglycolide or Polyglycolic acid (PGA)
\*\*Polylactic acid (PLA)
\*\*Polycaprolactone (PCL)
\*\*Polyethylene adipate (PEA)
Polyhydroxyalkanoate (PHA)
Polyethylene terephtalate (PET)
Polybutylene terephthalate (PBT)
Polytrimethylene terephthalate (PTT)
\*\*Polyethylene naphthalate (PEN)
\*\*Vectran
\*\*Polyamides
\*\*Polyester resin
Pitch resin
\*\*Polyurethane resin

EXAMPLES

The following examples illustrate certain advantages and effects achieved by the present invention.

Comparative Example 1

Experiments with Polyethylene Glycol (PEG)

1. Electrical Resistance Changes in the CNT Fibre Impregnated with PEG

Several carbon nanotube fibres were impregnated with polyethylene glycol by immersion in liquid polyethylene glycol, and their electrical resistance was monitored. The resistance rose gradually, and an increase by about 50% was observed after 48 hours.

2. Electrical Resistance Changes of the as Made CNT Fibre and CNT Fibre Impregnated With PEG in Low Temperatures The electrical resistance changes of the as-made fibre were recorded in the temperature range from 273.15K to 10K. The as-made fibre was reheated back to room temperature, then impregnated with PEG and its resistance changes were recorded in the same temperature range from 273.15K to 10K. Relative changes of resistance are shown in FIG. 1. The upper line shows the fibre impregnated with PEG, the lower line the as-made fibre. The as-made fibre shows metallic type of behaviour down to about 130K which is almost completely lost when the sample is infiltrated with PEG.

3. Stress-Strain Curve Changes with PEG

A piece of fibre from one batch was chosen and 4 samples of the as-made fibre were elongated up to breakage and their stress-strain curves recorded using Favimat—a device used for mechanical testing of fibres. Then 4 further samples from the same piece of fibre were mounted in the Favimat grips and a droplet of polyethylene glycol grade 200 was smeared along the fibre (i.e. the fibre was immersed in the PEG droplet produced at the end of a pipette and the droplet was slid along the fibre clamped between the grips (20 mm)). Then the fibre was left for several minutes to adsorb PEG, after which stress-strain tests were performed, as described above for the as-made fibre sample. Table 1 gives characteristic values of force and elongation at yield as well as force and elongation at breaking point for all 4 fibres without PEG and 4 fibres with PEG.

TABLE 1

| No | Force at yield cN | Elongation at yield % | Breaking force cN | Breaking Elongation % |
|---|---|---|---|---|
| As-made fibre without PEG | | | | |
| 1 | 0.88 | 0.8 | 1.78 | 2.54 |
| 2 | 1.6 | 2.2 | 2.49 | 4.51 |
| 3 | 1.5 | 1.5 | 2.49 | 3.84 |
| 4 | 1.65 | 2 | 2.37 | 3.42 |
| Average value | 1.41 | 1.63 | 2.28 | 3.58 |
| Fibre with PEG | | | | |
| 1 | 0.7 | 0.8 | 1.67 | 3.01 |
| 2 | 1.13 | 1.4 | 1.29 | 2.08 |
| 3 | 0.7 | 0.8 | 1.63 | 4.1 |
| 4 | 0.65 | 0.7 | 1.61 | 4.03 |
| Average value | 0.79 | 0.93 | 1.55 | 3.31 |

4. Stiffness Changes on Adding and Removal of PEG

An as-made fibre sample was placed in Favimat grips. The fibre's linear density (LD) was measured and then it was 5 times cyclically elongated up to 0.5%. The LD measurement and 0.5% cyclic elongation was repeated twice more on this as-made fibre. Then PEG was applied to the fibre by sliding a droplet of PEG produced at the end of a pipette along the fibre clamped between the grips. After about 15 minutes from the application, the LD and 0.5% cyclic elongations tests were repeated twice.

Next, acetone was applied to the fibre, with the aim of removing the PEG, following which the measurement procedure described above was repeated twice. Table 2 presents the set of average values of LD, maximum force and maximum elongation and stiffness for all 3 states of the fibre as-made, following PEG application and after removal of PEG with acetone. Stiffness was calculated as:

$$\text{Stiffness} = \frac{\frac{\text{Maximum force}(N)}{LD(tex)}}{\text{Elongation(value in \%/100)}}$$

It is assumed that maximum force and elongation recorded in Favimat set to 0.5% elongation is below the yield point.

TABLE 2

| Fibre treatment | LD tex | Maximum force cN | Maximum elongation % | Stiffness N/tex | |
|---|---|---|---|---|---|
| as-made | 0.034 | 0.62 | 0.475 | 40.8 | |
| after PEG treatment | 0.06 | 0.48 | 0.475 | 16.8 (calculated using LD = 0.06) | 29.7 (calculated using initial LD = 0.034) |
| after acetone treatment | 0.033 | 0.62 | 0.45 | 41.75 | |

4a. Stress-Strain Curves with Resistance Recording

The standard fibre sample was mounted in the Favimat grips. It was connected to the electrical circuit and the resistance recording started. Once the as-made fibre resistance value was collected, PEG was applied along the fibre, as described above. During the application procedure, the resistance of the fibre increased and kept increasing after the droplet was removed. Once resistance reached a plateau, the fibre was elongated up to breakage with a speed of 2 mm/min. A stress-strain curve was recorded in the Favimat, along with constant resistance recording in Modulab. The full recording of resistance changes during the experiment is shown in FIG. 2.

Figure 2:
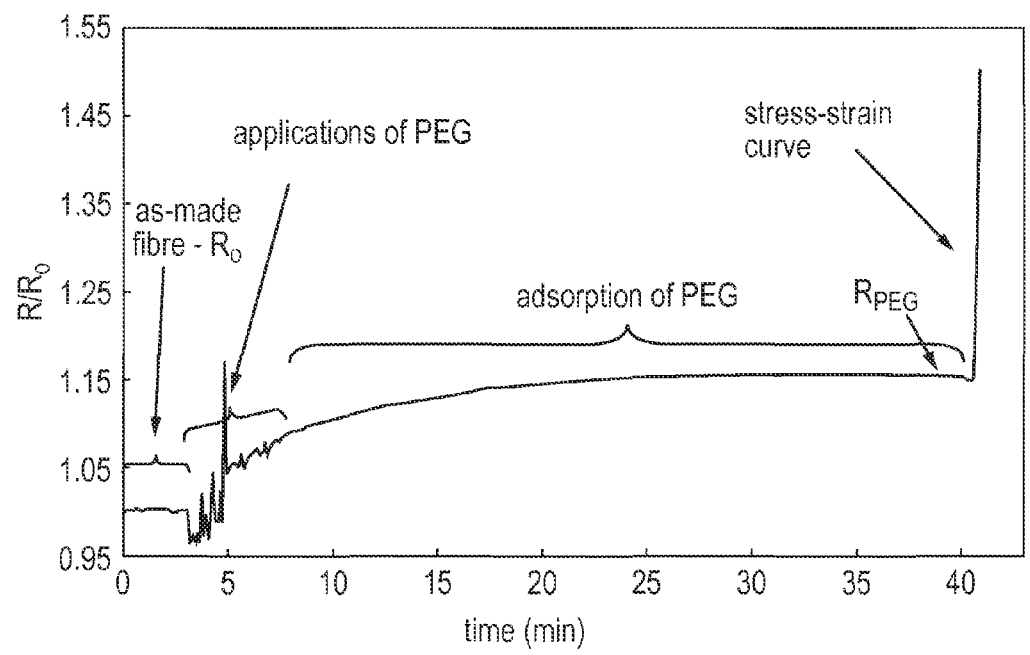
FIG. 2 shows the change of resistance of a carbon nanotube fibre sample mounted in tensile tester grips following application of PEG (several shots) and infiltration/adsorption of PEG, and in the final part due to elongation of the fibre up to breakage point, as measured in Comparative Example 1.
Figure 3A:
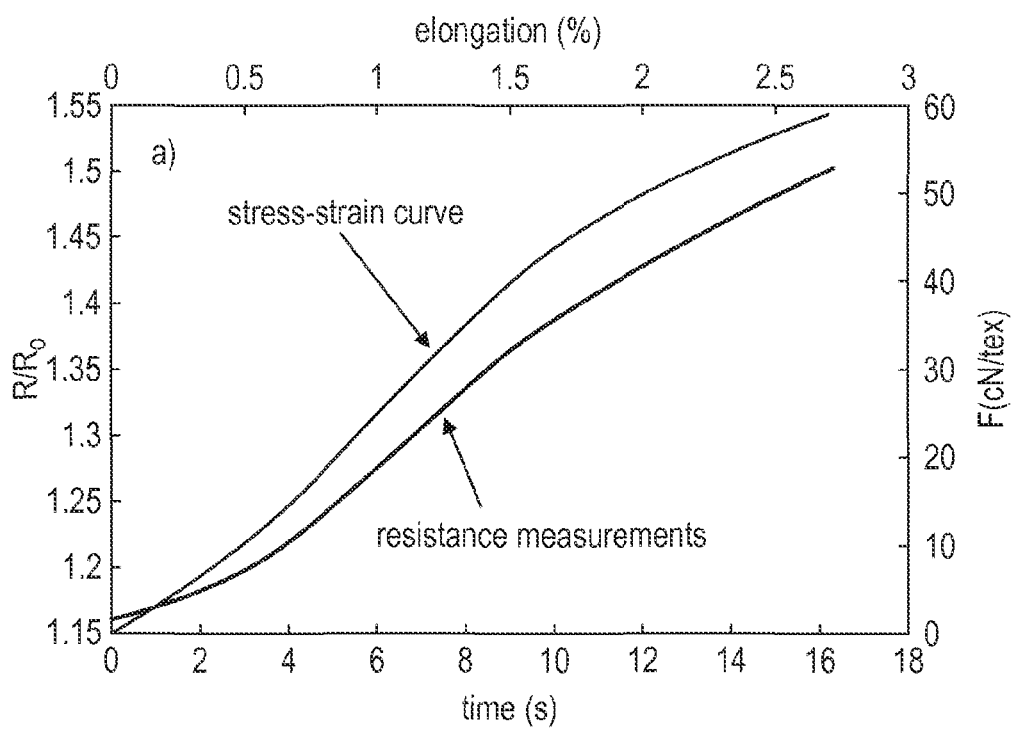
FIGS. 3A and 3B illustrate results obtained in Comparative Example 1 and show (FIG. 3A) the stress-strain curve with simultaneous resistance recording performed on a carbon nanotube fibre soaked with PEG and (FIG. 3B) a correlation of force and resistance waveforms from the graph of FIG. 3A. Resistance values are in both graphs referred to Ro which is the resistance measured before application of PEG.
Figure 3B:
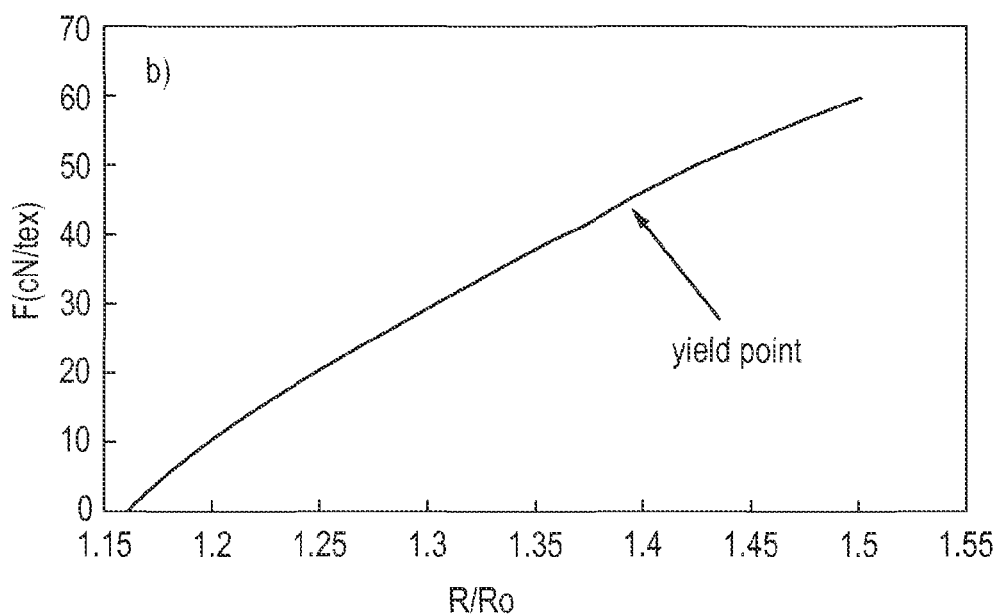
Figure 4A:
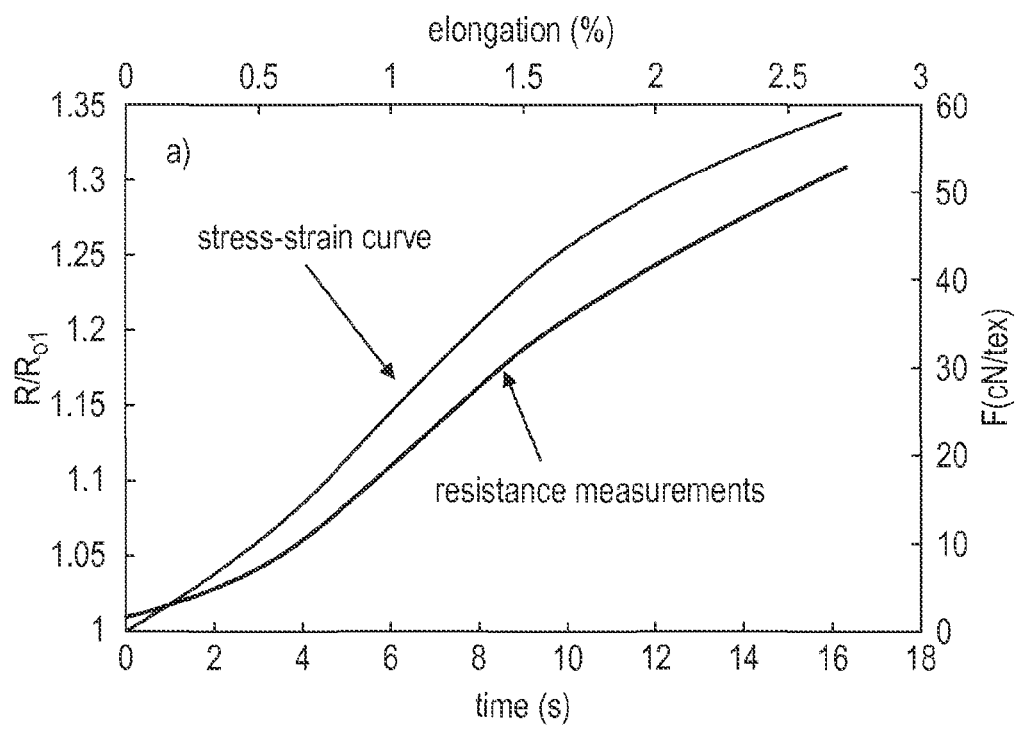
FIGS. 4A and 4B illustrate results obtained in Comparative Example 1 and show (FIG. 4A) the stress-strain curve with simultaneous resistance recording performed on a carbon nanotube fibre soaked with PEG and (FIG. 4B) a correlation of force and resistance waveforms from the graph of FIG. 4A. Resistance values are in both graphs referred to Ro1 which is the resistance measured after application of PEG just before the start of stress-strain curve.
Figure 4B:
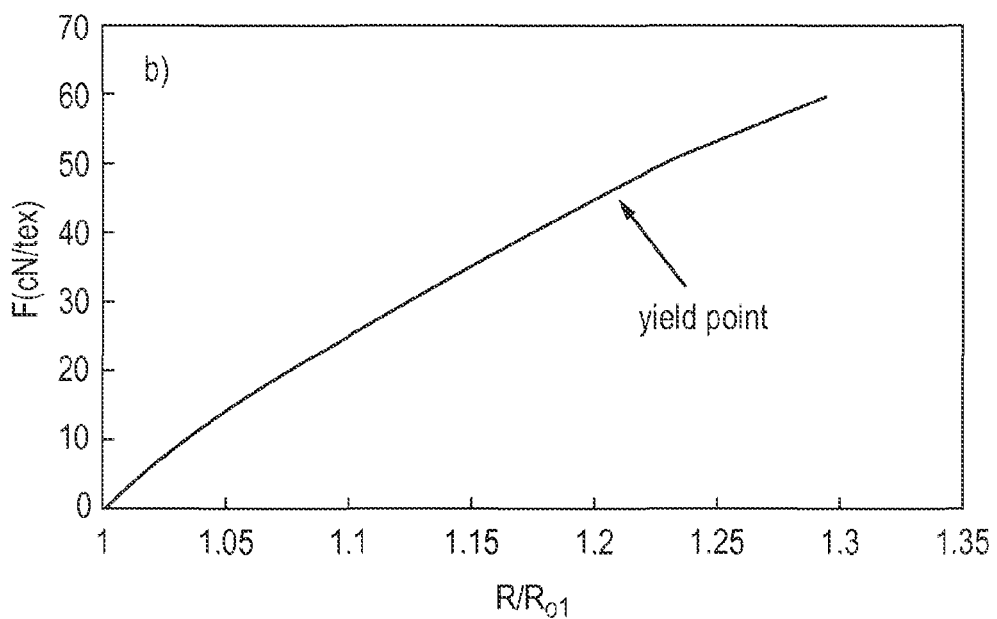

FIGS. 3 and 4 show the correlation of force and resistance during the stress-strain test (illustrated in the right-hand part of the graph shown in FIG. 2). The correlations in FIGS. 3 and 4 are shown in two configurations. Resistance ratio $R/R_o$ in FIG. 3 is calculated according to standard formula, where:

$R_o$ is the resistance of 40 mm long as made fibre sample before application of PEG, and $R = 2R_x - R_o$ where, $R_x$ is the resistance of 40 mm of fibre measured during the experiment (e.g. resistance after adding PEG and elongation of the fibre)

However, in FIG. 4 the reference resistance $R_{o1}$ is the resistance of 20 mm of the fibre placed between the Favimat grips and impregnated with PEG and it is calculated as:

$R_{o1} = R_o/2 + \Delta R_1$ where $\Delta R_1 = R_{PEG} - R_o$, and $R_{PEG}$ is the resistance of 40 mm long as made fibre sample after application of PEG (see also FIG. 4), and as above Ro is the resistance of 40 mm long as made fibre sample before application of PEG, Because the full ratio is calculated as:

$$\frac{R_{o1} + R_x - R_{PEG}}{R_{o1}}$$

where, as above $R_x$ is the resistance of 40 mm of fibre measured during the experiment (e.g. resistance after adding PEG and elongation of the fibre).

In this case R from $R/R_{o1}$ ratio stands for: $R = R_{o1} + R_x - R_{PEG}$.

In both FIG. 3A and FIG. 4A, the upper line shows the stress-strain curve, and the lower line the resistance measurements.

Figure 5:
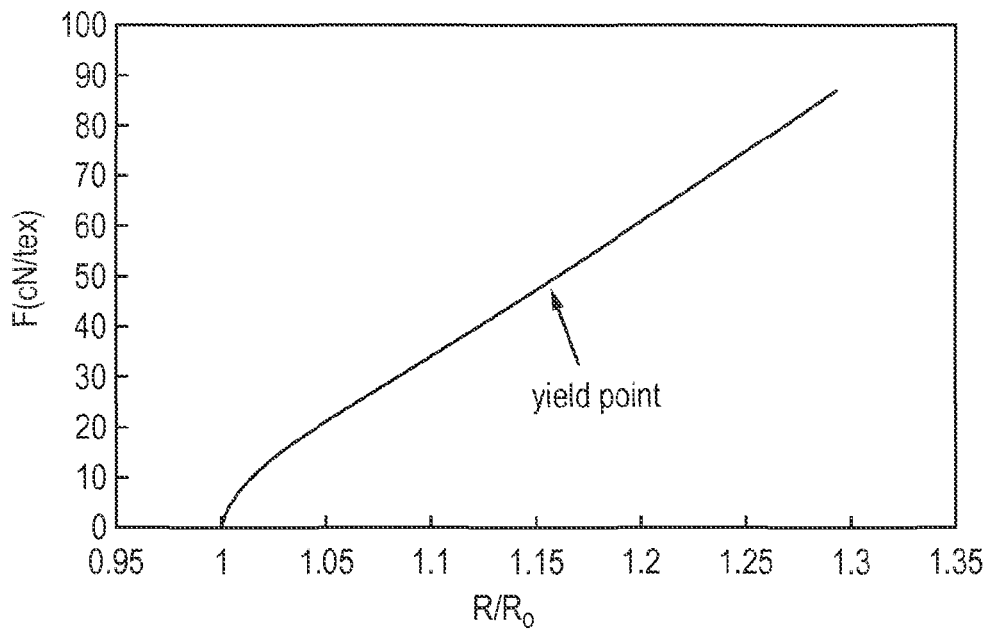
FIG. 5 illustrates further results obtained in Comparative Example 1, and shows a correlation of force and resistance prepared similarly as in FIG. 3B, but for an as-made carbon nanotube fibre (without PEG).

For comparison, FIG. 5 presents force resistance dependence determined for the as-made fibre (i.e. not soaked with PEG). The dependence was correlated from a stress-strain curve and simultaneous resistance recording performed on the as-made fibre.

5. Relaxation Experiment

Figure 6:
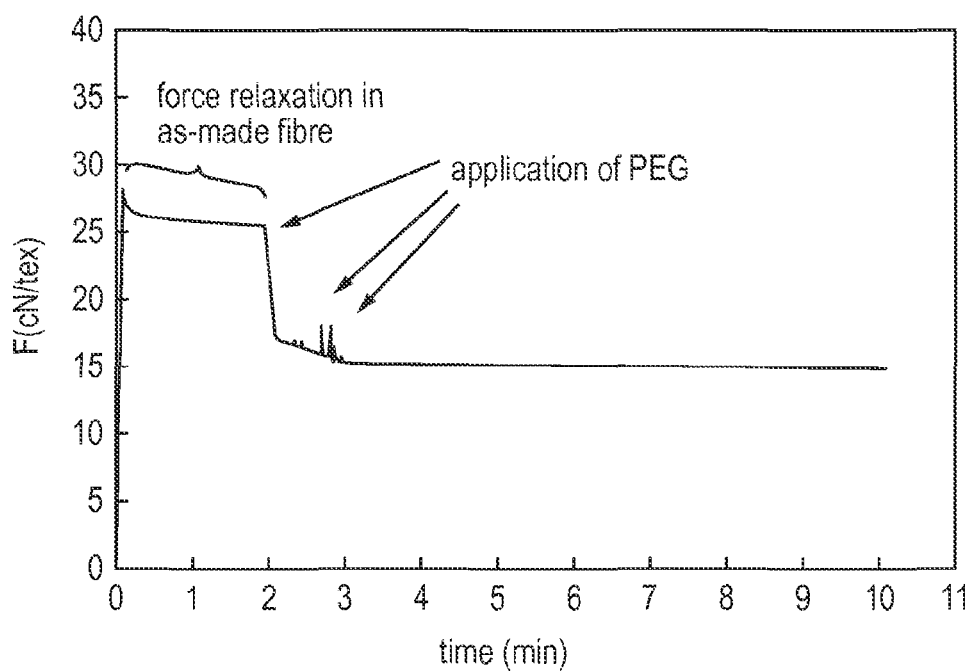
FIG. 6 illustrates further results obtained in Comparative Example 1, and shows a recording of the force changes in a carbon nanotube fibre elongated up to 0.7% and held at this strain to relax and increase of relaxation rate due to application of PEG.

The fibre was elongated up to 0.7% and kept at this strain for 10 minutes. After about 2 minutes from the beginning of the experiment (i.e. after the initial more rapid decrease of force) PEG was applied several times, which resulted in further considerable decrease of force as shown in FIG. 6.

6. Viscosity Effects

Figure 7:
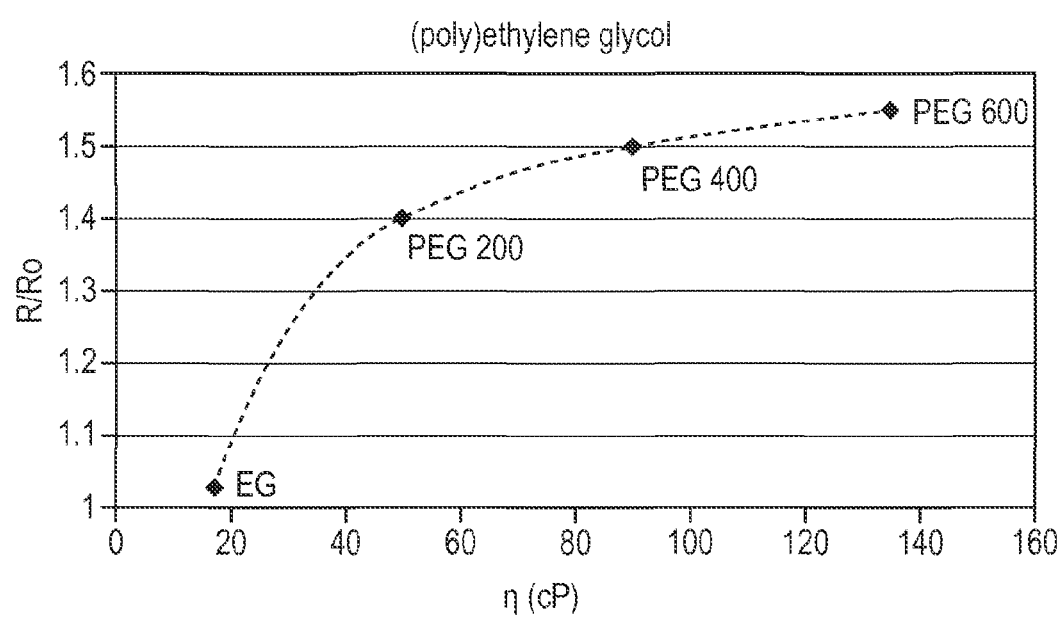
FIG. 7 shows how the resistance of a carbon nanotube fibre varies after application of PEG of different molecular weights, and therefore of different viscosities, determined in Comparative Example 1.

FIG. 7 shows how the resistance of a carbon nanotube fibre varies after application of PEG of different molecular weights, and therefore of different viscosities.

Note that these viscosities are considerably lower than those tested in Example 4.

Summary of Results of Comparative Example 1

Where PEG is applied to a carbon nanotube fibre, it readily infiltrates into the fibre, resulting in a deterioration of both electrical and mechanical properties.

Example 1

Silicone Paste Insulation

The inventors have found that electrical and mechanical properties are not significantly deteriorated when silicone paste is used to coat a carbon nanotube fibre.

Commercially available silicone adhesive paste (sealant; DOW CORNING® 732 Multi-Purpose Sealant) was used. The paste is a transparent insulating material. Its properties are presented in Table 3.

TABLE 3

| Property | Unit | Value |
|---|---|---|
| Apperance color | | Clear, White and Black |
| Mechanical Properties after cured 7 days in air at 25° C. and 50% relative humidity | | |
| Specific Gravity | | 1.04 |
| Durometre hardness | | 25 |
| Tensile strength | MPa | 2.3 |
| Elongation at break | % | 540 |
| Volume coefficient of thermal expansion | 1/K | $1.12 \times 10^{-3}$ |
| Electrical Properties after cured 7 days in air at 25° C. and 50% relative humidity | | |
| Dielectric Strength | KV/mm | 21.6 |
| Dielectric constant at 100 Hz/100 kHz | | 2.8 |
| Dissipation factor at 100 Hz/100 kHz | | 0.0015 |
| Volume resistivity | Ohm · cm | $1.5 \times 10^{-15}$ |
| Potential Hazards | | |
| Eye | | Direct contact may cause moderate irritation |
| Skin | | May cause moderate irritation |
| Inhalation | | Irritates respiratory passages very slightly |
| Oral | | Low ingestion hazard in normal use |

The silicone adhesive paste sets (cures) at room temperature in naturally humid air. Once set, it is stable and flexible from −60° C. to +180° C., and can tolerate short temperature peaks up to 205° C.

The silicone paste was successfully applied to individual CNT fibres i.e. as thin as 10 μm to 20 μm in diameter, by manually drawing the fibre through a droplet of silicone paste.

Figure 8A:
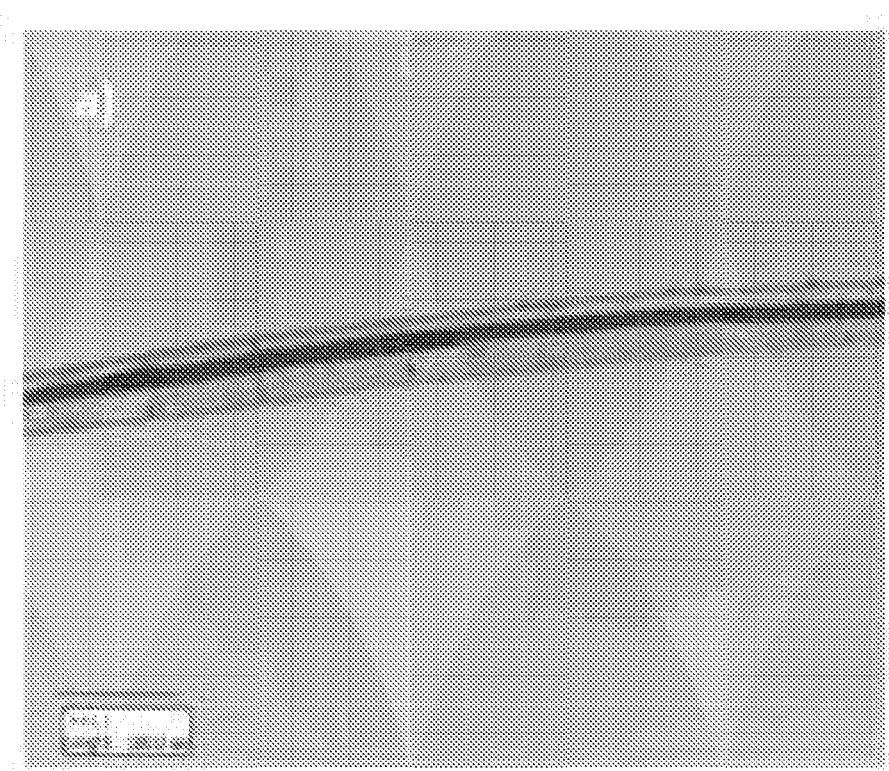
FIGS. 8A and 8B show (FIG. 8A) an optical microscope longitudinal image and (FIG. 8B) a scanning electron microscope cross-sectional image of an individual carbon nanotube fibre insulated with the silicone adhesive paste, prepared in Example 1.
Figure 8B:
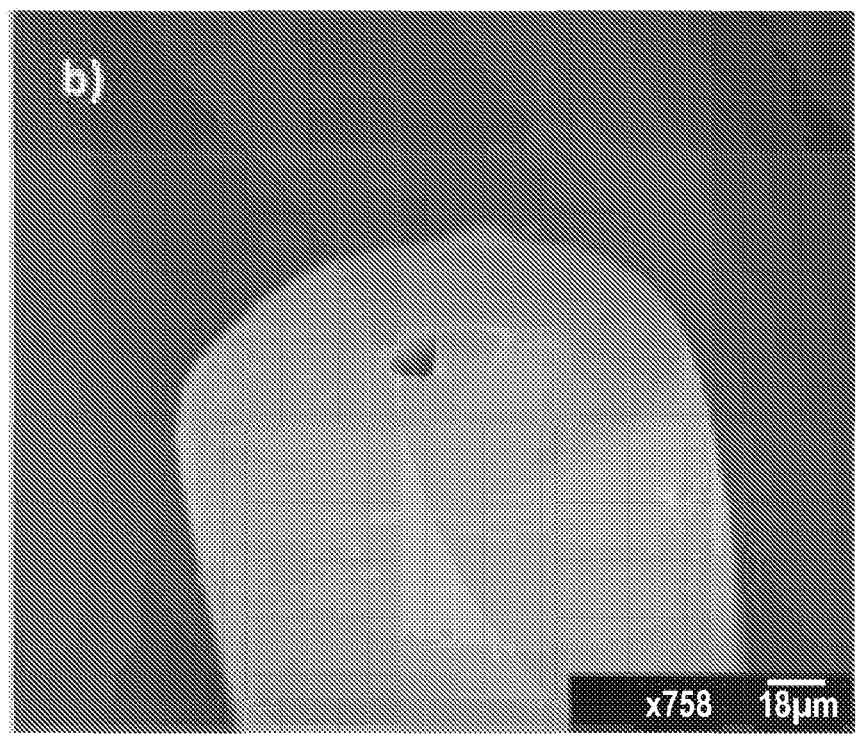

FIG. 8 shows (A) an optical microscope image and (B) a scanning electron microscope image of an individual carbon nanotube fibre insulated with the silicone paste. A clear separation between the sealant and the fibre is clearly visible, indicating no infiltration of the sealant into the fibre.

Figure 9:
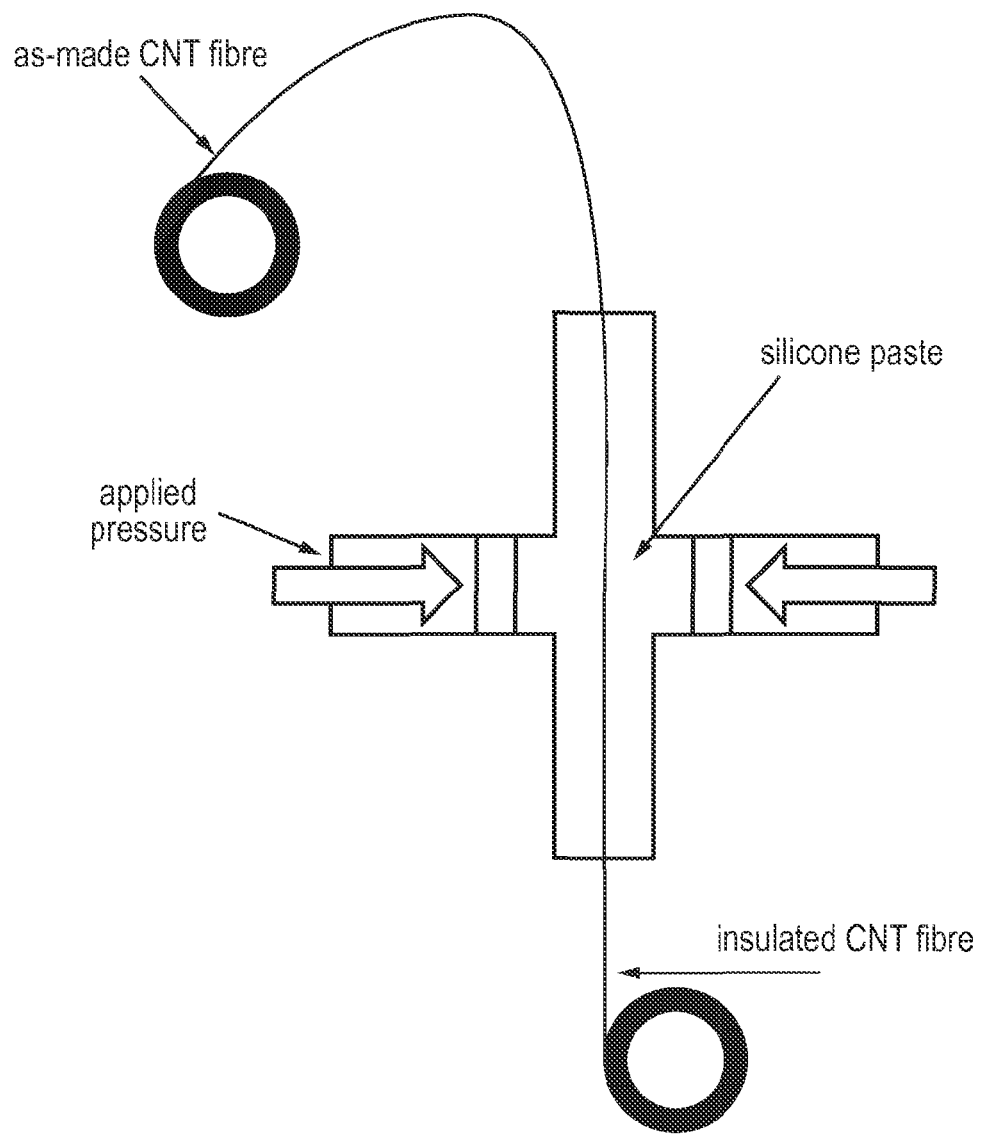
FIG. 9 shows a suitable schematic arrangement for applying silicone sealant to carbon nanotube materials.

Silicone paste may be applied to the fibre using an automated system. This allows the application of the silicone paste to meters long thicker CNT ropes and wires (comprising many fibres in a bundle) as well as to carbon fibre. Several meters of carbon nanotube wire were insulated and used to produce working electrical devices wired purely with carbon nanotube wires. The set up for automated application of sealant insulation is illustrated schematically in FIG. 9

Mechanical Properties Preservation

Figure 10A:
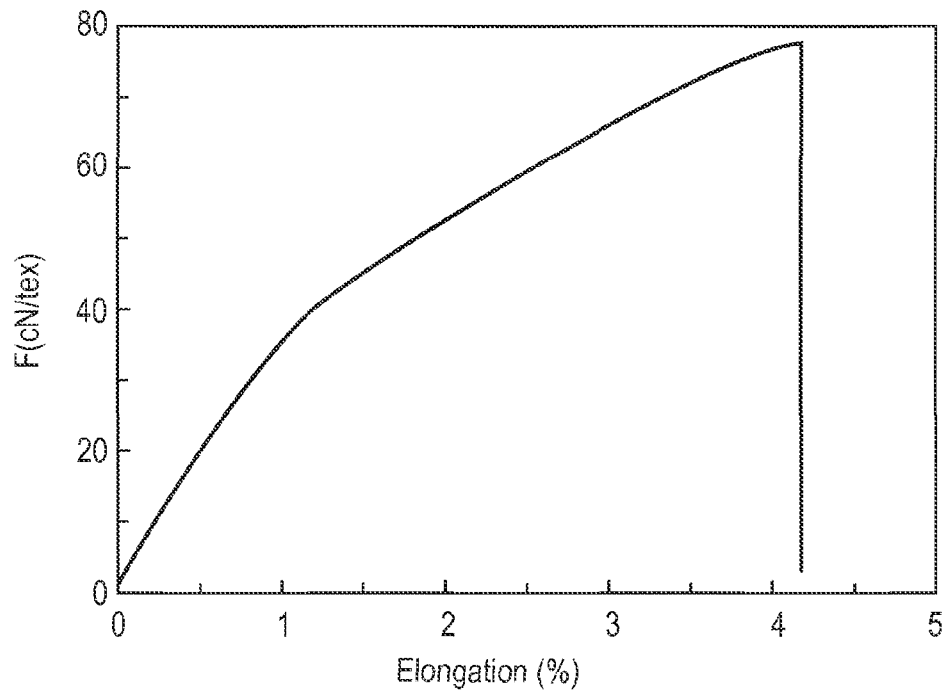
FIGS. 10A and 10B shows stress-strain curves measured in Example 1 curves for (FIG. 10A) as-made carbon nanotube fibre and (FIG. 10B) silicone adhesive coated carbon nanotube fibre.
Figure 10B:
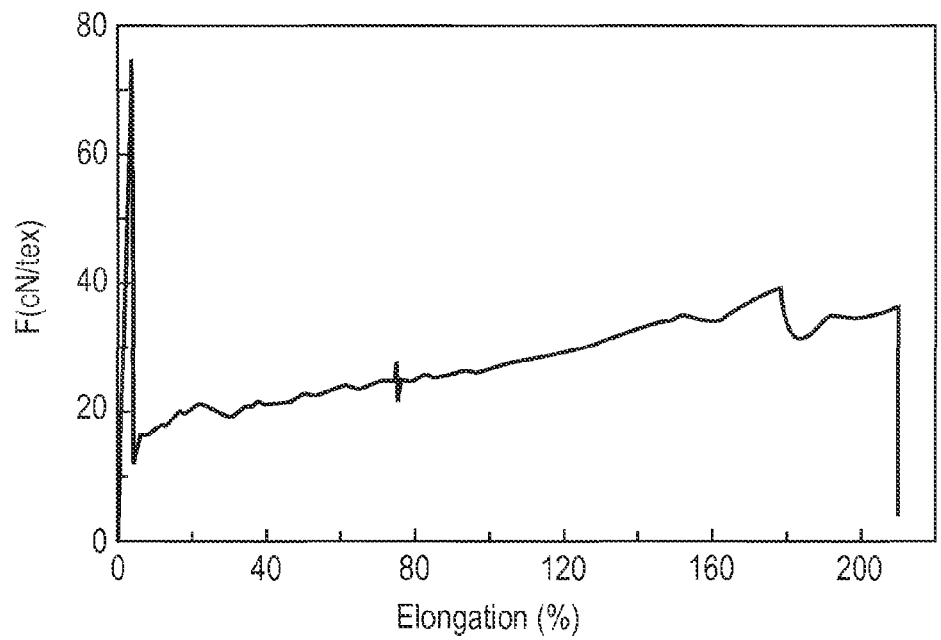

The carbon nanotube fibres insulated with silicone paste preserve the mechanical performance of the as-made fibres. FIG. 10 shows the stress-strain curves measured for (A) as-made carbon nanotube fibre and (B) silicone adhesive coated carbon nanotube fibre. Both samples have the same maximum strength reached at elongation of several %. The abrupt decrease of stress signals the breakage of the carbon nanotube fibre. In case of the silicone coated fibre, the breakage of fibre is followed by extension of the remaining thin coating. These figures show the fibre rupture at about 3% elongation, while the thin layer of insulation kept elongating until failure above 200%. These results clearly indicate separation between the carbon nanotube fibre and the polymeric insulating layer.

Electrical Properties Preservation

The insulated carbon nanotube fibres coated with silicone paste preserve the electrical performance of as-made fibres. Tables 4 and 5 show a comparison of the values of resistance before and after coating as well, as a comparison of the maximum voltage, current and temperature obtained for as-made and coated fibres. The values are similar so no deterioration of electrical performance is observed.

TABLE 4

(as-made fibre):

| Resistance of uncoated sample | Voltage at burning | Current at burning | Max temperature reached |
|---|---|---|---|
| k$\Omega$ | V | mA | ° C. |
| 3.135 | 63.125 | 7.10875 | 105 |

TABLE 5

(silicone adhesive coated fibre):

| Resistance of uncoated sample | Resistance of silicone paste coated sample | Voltage at burning | Current at burning | Max temperature reached |
|---|---|---|---|---|
| k$\Omega$ | k$\Omega$ | V | mA | ° C. |
| 3.283 | 3.082 | 56.88 | 7.682 | 102.3 |

Example 2

Low Density Polyethylene (LDPE) Insulation

Figure 11:
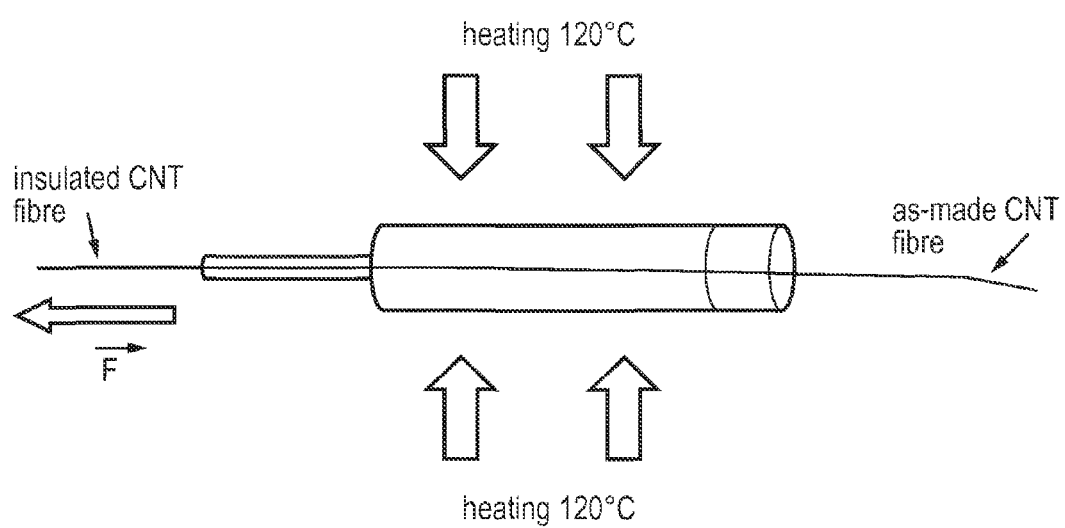
FIG. 11 illustrates schematically a suitable arrangement for coating fibres e.g. with polyethylene.

Yarns of carbon nanotube fibres were pulled through a glass vessel containing melted low density polyethylene. A suitable setup for coating fibres e.g. with polyethylene is illustrated schematically e.g. in FIG. 11.

Figure 12A:
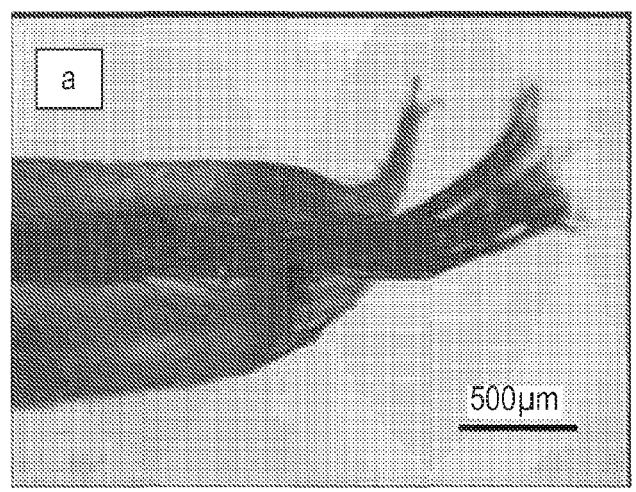
FIGS. 12 A-C show optical microscope images of a carbon nanotube yarn (bundle of fibres) coated with a LDPE coating, prepared in Example 2.
Figure 12B:
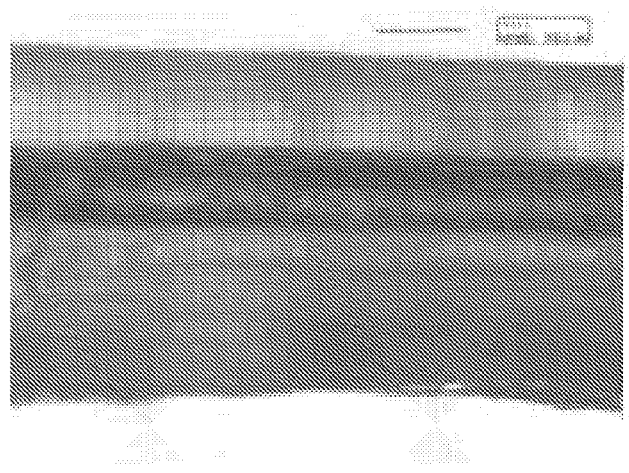
Figure 12C:
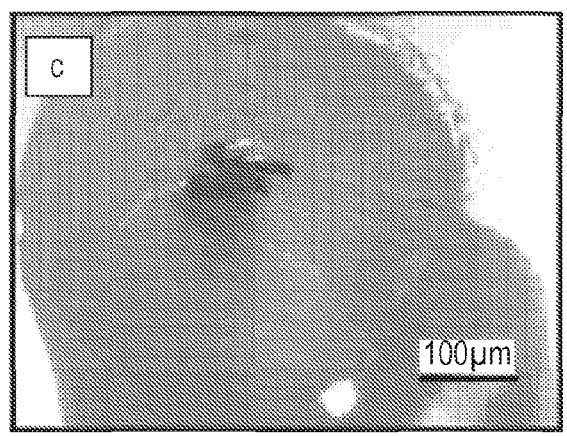

FIGS. 12 A-C shows optical microscope images of a carbon nanotube wire (with several individual bundles of fibres) coated with a LDPE coating. Clear separation between the coating layer and the carbon nanotube yarn is visible. Particularly in FIG. 12A, the individual carbon nanotube fibres in the carbon nanotube yarn are separated when pulled out from the wire, this would not be possible if those fibres were infiltrated with the LDPE during the coating process.

The electrical properties of the coated and uncoated yarn were tested, and no significant changes were observed following coating with LDPE.

Example 3

Effect of Various Polymers on Electrical Properties

Low density polyethylene (LDPE), High Density Polyethylene (HDPE), Polyvinyl chloride (PVC), Ultra High Molecular Weight Polyethylene, Isotactic Polypropylene (PP), Polyethylene oxide (PEO), Polystyrene (PS), Poly Vinyl Acetate (PV Acetate), Polymethylmetharylate (PMMA), Poly1)isphenol A Carbonate (BisphenolA Garb.), Polyether imide (PEI) and Epoxy resin were tested according to the following protocol.

For each polymer tested, a carbon nanotube fibre was first connected to electrical terminals using silver paint. This is done to ensure good electrical connection to the fibre. Between the electrical terminals, a trough was provided, in which the fibre is based. The trough is used as the container for the different liquids in which the fibre is immersed. Next, molten polymer was poured into the trough, to fully immerse the fibre. The resistance of the fibre was measured and monitored for 30 minutes after initial immersion. The time is recorded when no more increase in resistance is observed. Conductivity measurements taken before and after immersion are shown in Table 6a below. As shown in Table 6a, a very large decrement in conductivity is not observed. Therefore the conducting channels of the fibres are not destroyed by infiltration of the polymers.

TABLE 6a

| Polymer Sample | Conductivity of pure sample | Conductivity after exposure to the polymer |
|---|---|---|
| L.D.P.E | 2.68+−0.1E04 | 1.87+−0.14E04 |
| H.D.P.E. | 2.68+−0.1E04 | 7.11+−0.1E03 |
| P.V.C. | 2.68+−0.1E04 | 1.25+−0.1E04 |
| UltraHigh Mol. Wt. P.E. | 2.68+−0.1E04 | 1.79+−0.1E04 |
| Isotactic P.P. | 2.68+−0.1E04 | 9.21+−0.1E03 |
| P.E.O. | 2.68+−0.1E04 | 8.41+−0.2E03 |
| P.S. | 2.68+−0.1E04 | 1.44+−0.1E04 |
| P.V. Acetate | 2.68+−0.1E04 | 1.43E+−0.2O4 |
| P.M.M.A. | 2.68+−0.1E04 | 1.84+−0.2E04 |
| BisphenolA Carb. | 2.68+−0.1E04 | 2.04+−0.1E04 |
| P.E.I. | 2.68+−0.1E04 | 1.45+−0.2E04 |
| Epoxy Resin | 2.68+−0.1E04 | 1.83+−0.1E04 |

The melting point of each polymer is given in Table 6b below, along with the viscosity (from literatures) and observed R/R0 values for some of the polymers. The experiments were carried out at the melting point temperature indicated for each polymer.

TABLE 6b

| Polymer matrix used | Melting point (°C.) at which the experiment was performed | Viscosity (cP) (from literature) | R/R$_o$ | Interaction Observed through SEM images |
|---|---|---|---|---|
| L.D.P.E. | 120 | $3 \times 10^5$ | 1.43 | Large amount of Polymer infiltration seen. |
| BisphenolA Carb. | 267 | $10^6$ | 1.31 | Regions clearly showing infiltration of Polymer visible. |
| P.E.O. | 70 | $3 \times 10^5$ | 3.19 | High infiltration. |
| P.S. | 240 | $5 \times 10^6$ | 1.86 | Low infiltration of Polymer observed. |
| P.V. Alcohol | 220 | — | | Very large polymer infiltration seen. |
| P.M.M.A. | 200 | $5 \times 10^7$ | 1.46 | Low Polymer penetration observed. |
| P.V. Acetate | 150 | $2 \times 10^5$ | 1.87 | Low infiltration seen. |
| Isotactic PP | 176 | $3 \times 10^6$ | 2.91 | High amount of Polymer penetrating the CNT sheet seen. |
| UltraHigh Mol. Wt, P.E. | 146 | — | 1.50 | Very high amount of Polymer penetration observed. |
| P.E.I. | 340 | — | 1.85 | Low Polymer penetration seen. |
| P.V.C. | 227 | $2 \times 10^7$ | 2.14 | Low Polymer Penetration seen. |
| H.D.P.E. | 130 | $10^6$ | 3.77 | Some Polymer infiltration observed. |
| Epoxy resin | | — | 1.46 | |

When tested on non-densified CNT fibres all of the above polymers excluding DOW CORNING®732 Multi-Purpose Sealant cause an increase in resistance from 10 to 75% depending on the polymer. However, some conductivity was retained for each polymer. Therefore, the conducting channels are not destroyed by infiltration of any of the polymers (this was also observed through SEM images of each sample).

Unlike Example 2 where the fibres were drawn through a bath of flowable insulating material, in the present Example the fibre was allowed to remain in the molten polymer for several minutes. The present inventors consider that where the fibre is exposed to the molten polymer for a shorter period of time, and/or with a lower viscosity, little or no infiltration will occur. Successful results are demonstrated in Examples 1, 2 and 4.

The relatively low conductivity before immersion in the molten polymer is a result of the carbon nanotube fibre used.

Comparative Example 2

Permanent Resistance Increase with PEO

Figure 13:
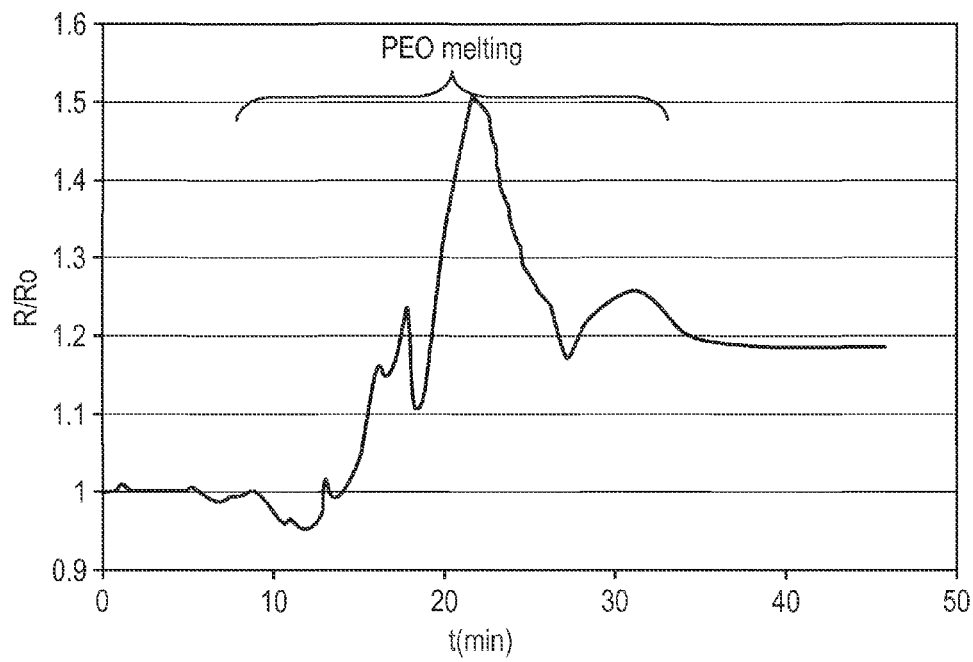
FIG. 13 shows the variation of resistance with time of a bundle of carbon nanotube fibres when exposed to molten polyethylene oxide, from Comparative Example 2.

A bundle of carbon nanotube fibres (each fibre was about 10 μm in diameter, overall diameter of the bundle was about 1 mm) was exposed to molten polyethylene oxide. Infiltration by the polymer takes place resulting in permanent increase in the resistance. R is resistance at time t and R$_o$ is the resistance at time 0. FIG. 13 shows the results.

Example 4

Viscosity Effects

In order to determine the effect of viscosity of the liquid polymer on its likelihood to infiltrate carbon nanotube fibres, the effect of polydimethylsiloxane (PDMS) of various viscosities and low density polyethylene (LDPE) of different viscosities was studied. LDPE was used to provide a high viscosity range matrix which is above PDMS solidification threshold. PDMS of 500 cSt (485.5 cP), 30,000 cSt (29280 cP), 60,000 cSt (58560 cP) and 100,000 cSt (97700 cP) was applied to carbon nanotube fibres placed in small containers. Resistance of the fibres fully immersed in PDMS was recorded for at least 20 mins. The resistance increase values after 20 mins of soaking referred to the initial value of resistance of the given sample are presented in Table 7.

Table 7 shows also dynamic viscosities of LDPE, which gave no increase in resistance of the carbon nanotube fibre. LDPE experiments were performed on a bundle (or cord) of carbon nanotube fibres (each fibre was 10 microns in diameter, and the overall bundle (cord) diameter was about 1 mm) fully covered by LDPE powder and then heated up to different temperatures up to almost burning of LDPE. No increase in resistance with reference to the initial resistance was observed after cooling down of the sample.

Figure 14:
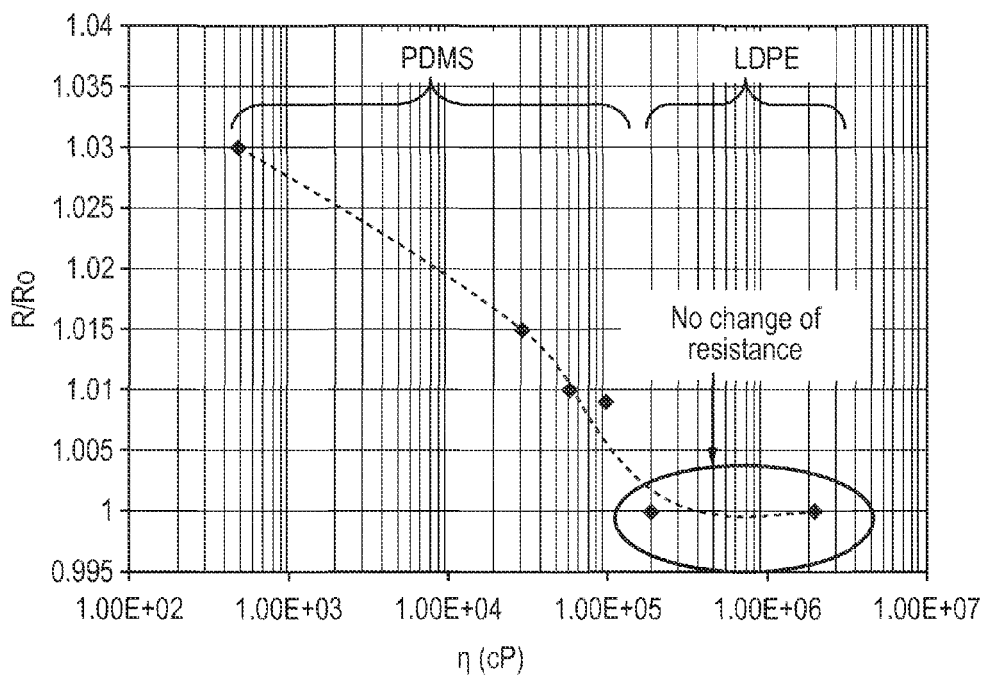
FIG. 14 shows a logarithmic plot of resistance against viscosity, presenting the results of Example 4.

Data from Table 7 is plotted in FIG. 14 as resistance change against viscosity. Viscosities are presented on a logarithmic scale. From Table 7 and FIG. 14 it is observed that polymers with viscosities above 100 000 cP are likely to remain on the surface of the CNT fibre and not infiltrate the interbundle spaces.

TABLE 7

| Polymer type | Dynamic viscosity | R/Ro after 20 mins from application |
|---|---|---|
| | cP | |
| PDMS 500 cSt | 485.5 | 1.03 |
| PDMS 30,000 cSt | 29280 | 1.015 |
| PDMS 60,000 cSt | 58560 | 1.01 |
| PDMS 100,000 cSt | 97700 | 1.009 |
| LDPE at 280° C. | 185,000 | 1 |
| LDPE at 150° C. | 2,000,000 | 1 |

The viscosity values quoted above were calculated from the values given in references [9,10,11].

Figure 19:
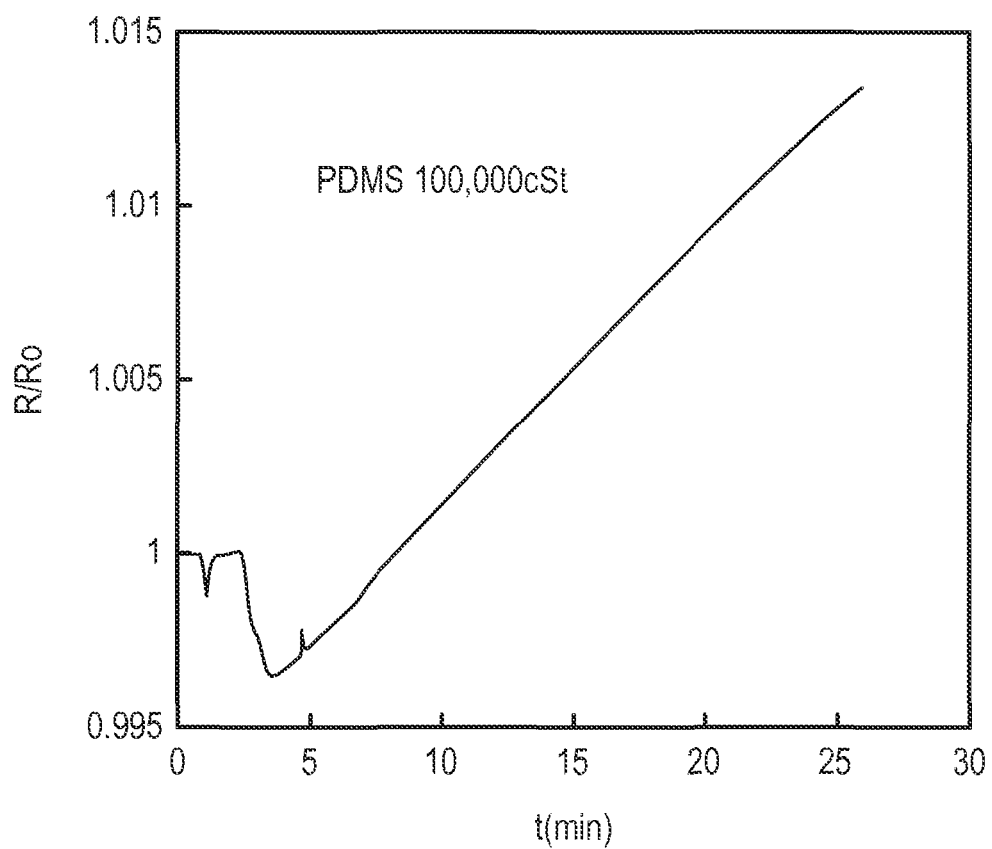
FIG. 19 shows the variation of resistance with time of a bundle of carbon nanotube fibres when exposed to PDMS, from Example 4.

FIG. 19 shows the carbon nanotube fibre resistance change measured due to infiltration of the fibre with PDMS of 100 000 cSt. Initially, after adding PDMS the resistance of the CNT fibre decreased, it is thought that this is due to the force exerted on the lateral surface of the fibre causing better condensation of the fibre and improved contact between the nanotubes. After about 5 mins PDMS started to infiltrate the nanotube network and impede the transport of electrons which causes the resistance of the CNT fibre to increase.

Example 5

SEM Imaging

Figure 15A:
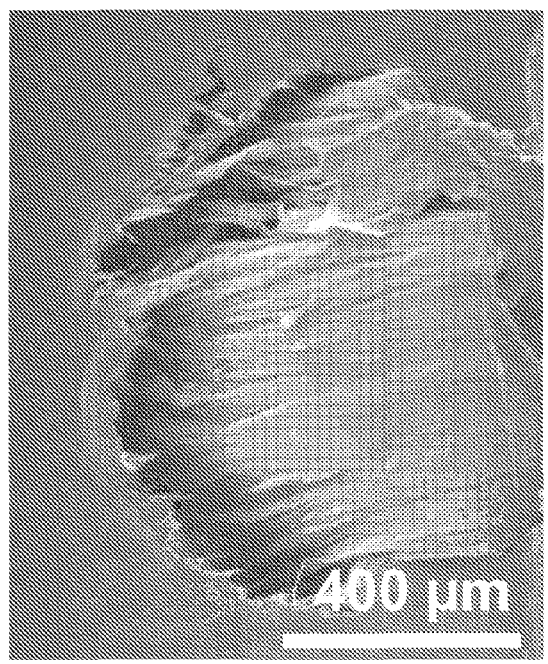
FIGS. 15A and 15B show SEM images of a cross-section of a carbon nanotube fibre coated with insulating polymer, where the insulator has not infiltrated the fibre.
Figure 15B:
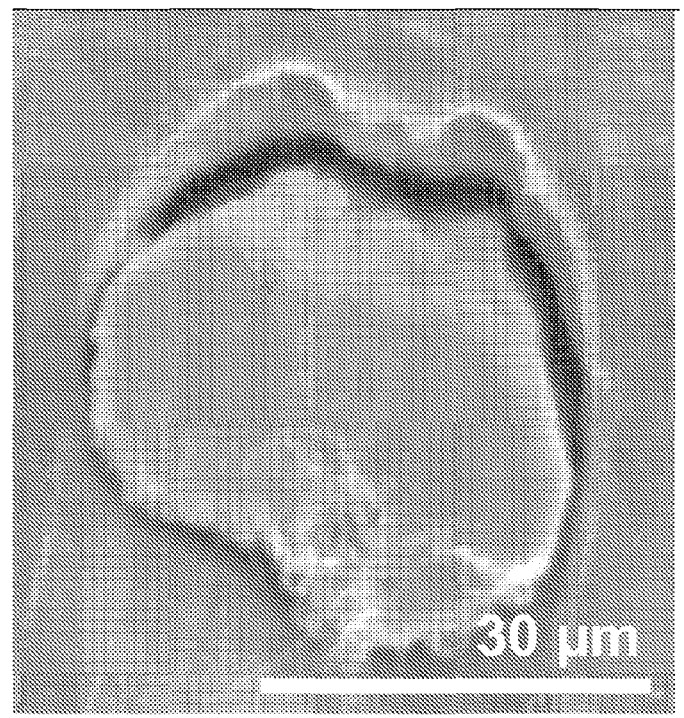
Figure 16A:
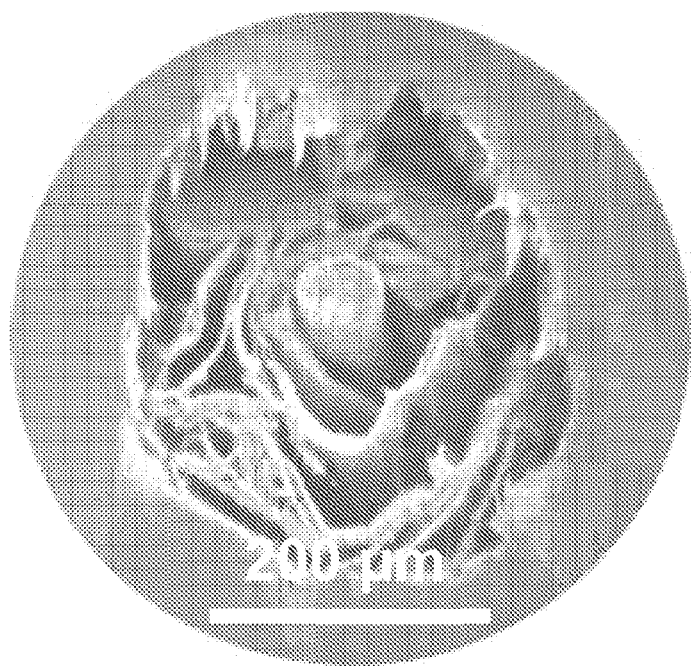
FIGS. 16A to 16D show SEM images of a cross-section of a carbon nanotube fibre coated with insulating polymer, where the insulator has partially infiltrated the fibre.
Figure 16B:
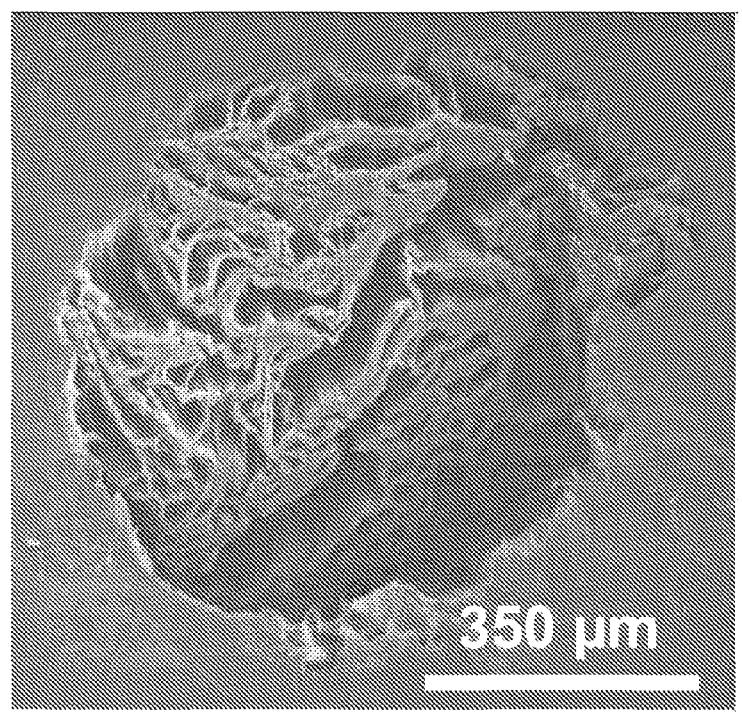
Figure 16C:
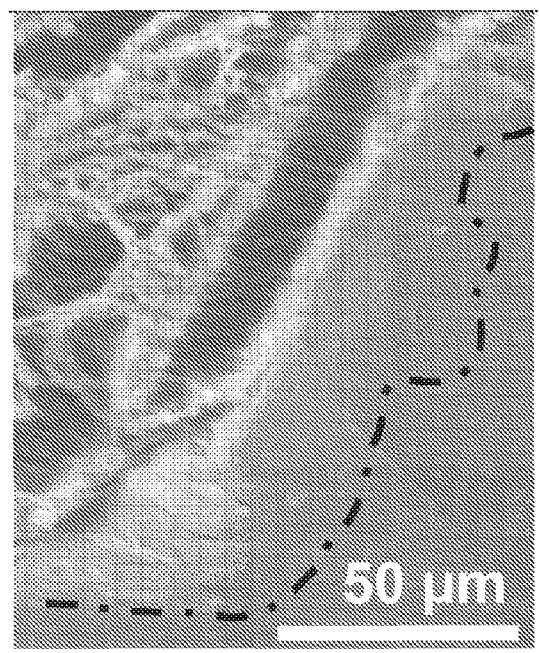
Figure 16D:
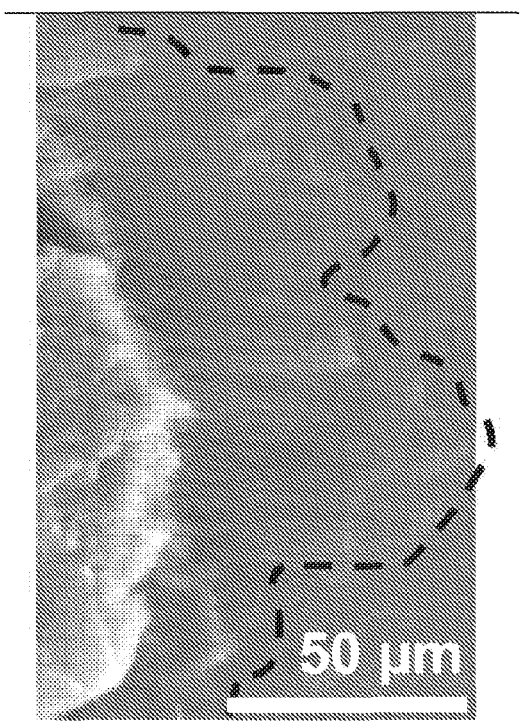
Figure 17A:
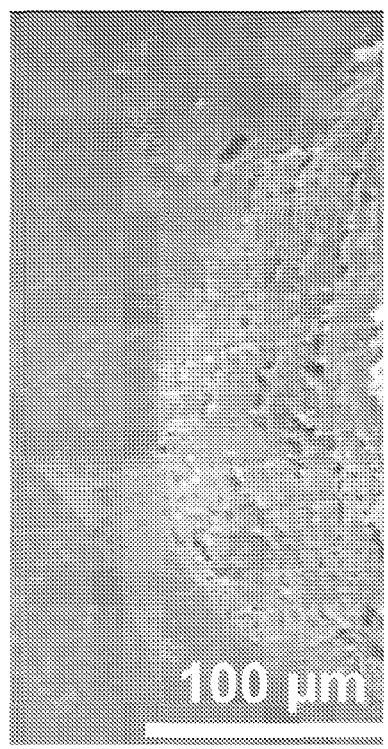
FIGS. 17A to 17D show SEM images of a cross-section of a carbon nanotube fibre coated with insulating polymer, where the insulator has substantially fully infiltrated the fibre.
Figure 17B:
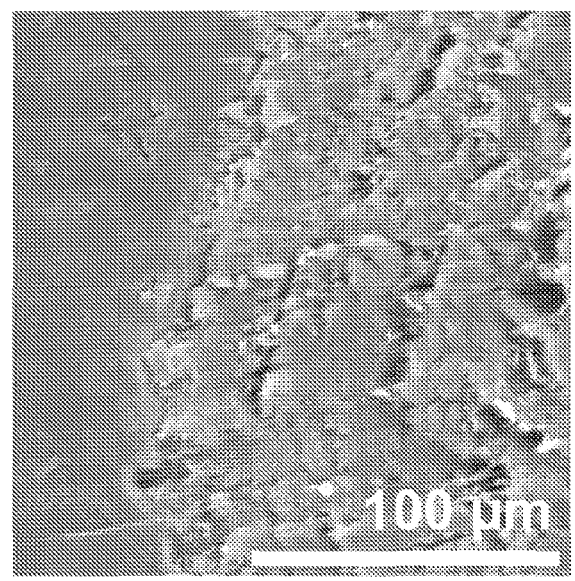
Figure 17C:
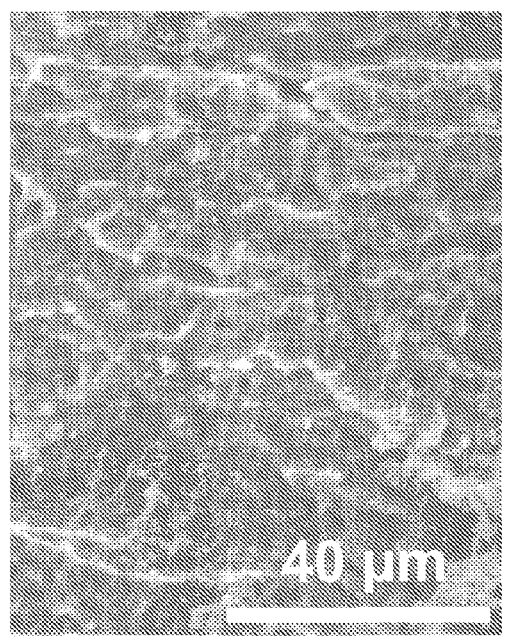
Figure 17D:
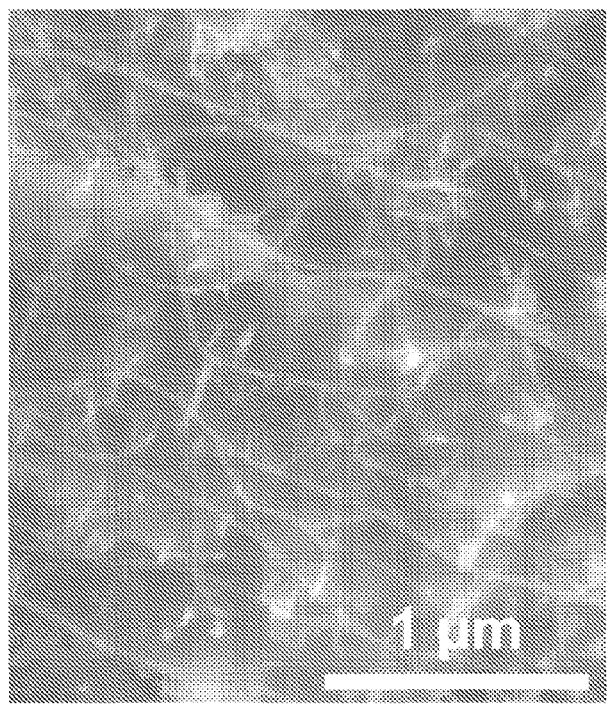

FIGS. 15 A and B show SEM images of a cross-section of a carbon nanotube fibre coated with insulating polymer, where the insulator substantially has not infiltrated the fibre. A clean border between fibre and insulator can be seen. The image in FIG. 15A is of a fibre drawn through LDPE, at 250° C., and in FIG. 15B of a fibre drawn through silicone paste at room temperature.

FIGS. 16 A to D show SEM images of a cross-section of a carbon nanotube fibre coated with insulating polymer, where the insulator has partially infiltrated the fibre. The fibre is partially embedded in the surrounding matrix. The dotted line in FIGS. 16 C and D indicates the edge of the carbon nanotube fibre. These Figs. show the result of immersing a fibre in molten PEO at 150° C.

FIGS. 17 A to D show SEM images of a cross-section of a carbon nanotube fibre coated with insulating polymer, where the insulator has substantially fully infiltrated the fibre. Spaces in the fibre are filled with polymer. Here, a fibre was immersed in epoxy resin for 5 seconds, followed by curing.

Figure 18:
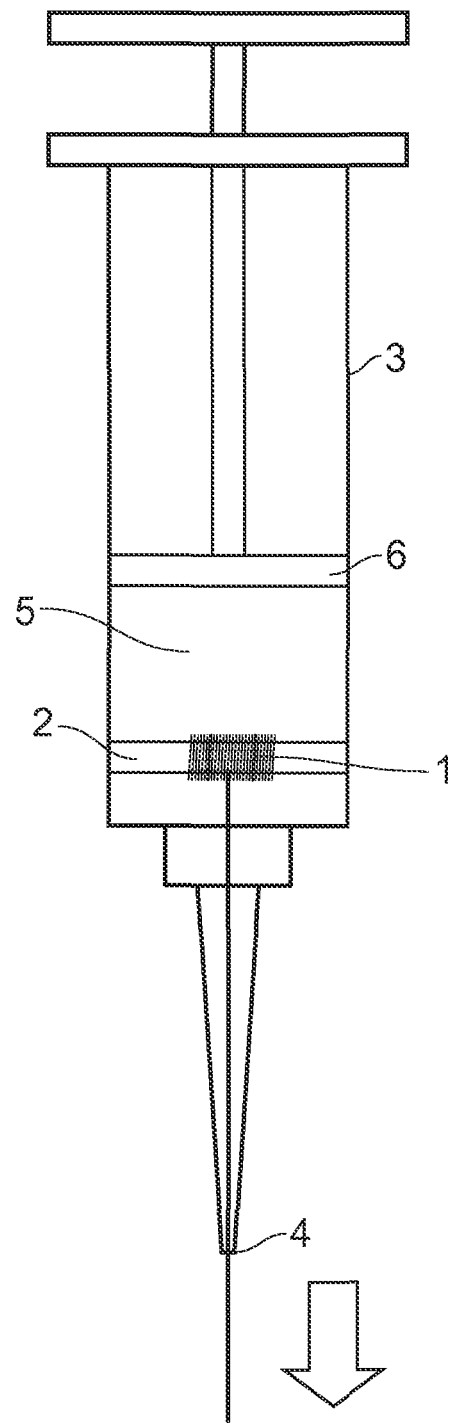
FIG. 18 illustrates schematically a suitable arrangement for applying flowable insulating material to a fibre comprising carbon nanotubes.

A further suitable method for applying flowable insulating material to a fibre is illustrated in FIG. 18. Firstly, a fibre 1 is wound around a cylinder 2. The cylinder 2 is then placed in a syringe 3. The cylinder 2 is selected to have a length equal to the internal diameter of the syringe 3. A free end of the fibre 1 is drawn out through the tip 4 of the syringe 3. Flowable insulating material 5 (e.g. a siloxane polymer, for example a siloxane based polymer or siloxane paste) is added to the syringe. Pressure is applied using the plunger 6 of the syringe, and simultaneously the free end of the fibre 1 is pulled out of the tip 4. The fibre emerges from the syringe with a coating of insulating material.

Example 6

Latex Insulation

Figure 20A:
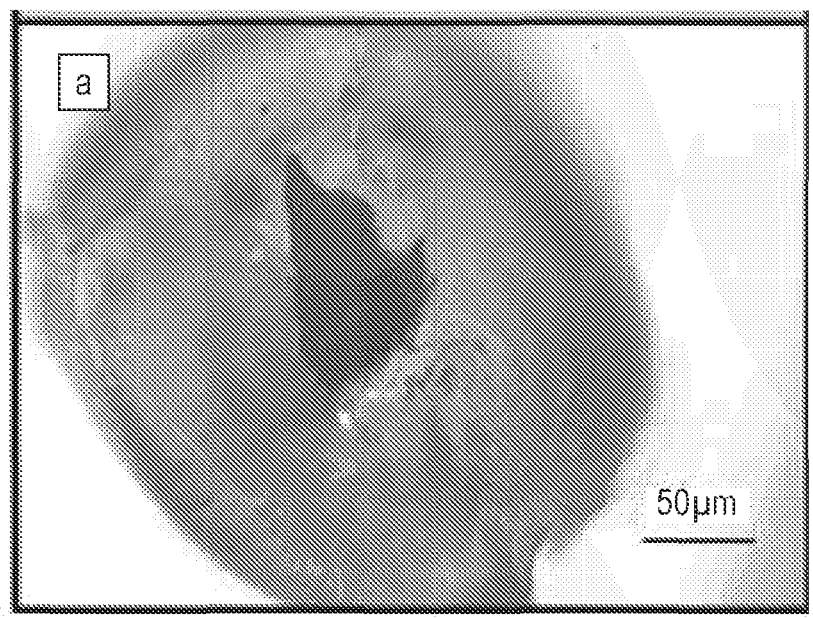
FIGS. 20A and 20B show an optical microscope and macroscopic image of a cross-section and a plan view respectively of a carbon nanotube fibre coated with latex insulating polymer, where the latex has not infiltrated the fibre, prepared in Example 6.
Figure 20B:
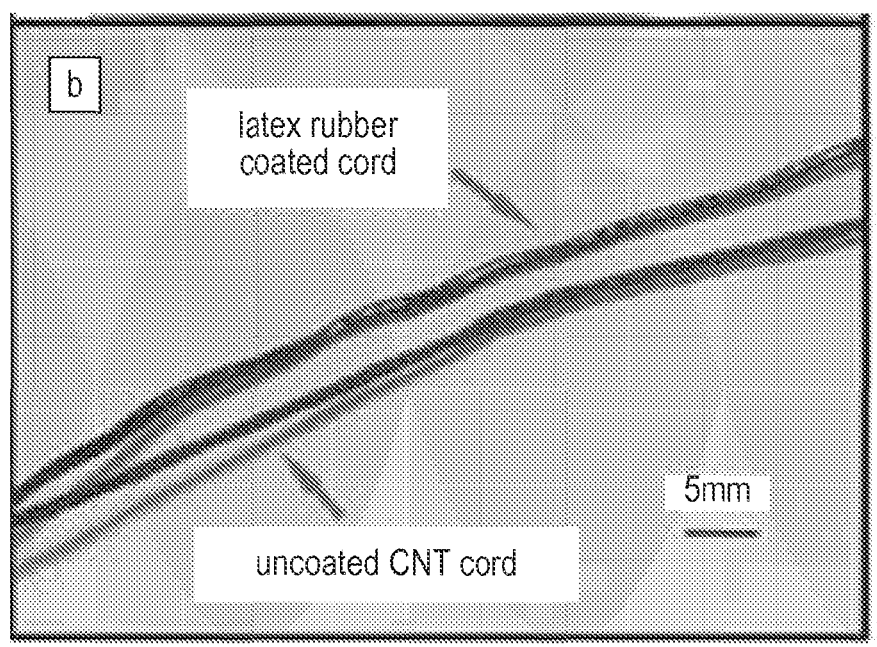

Carbon nanotube fibres were pulled through a container filled with latex rubber (a colloidal suspension of latex rubber particles in water). The thin layer of coating left on the surface of the fibre was heat dried within seconds. It would be possible to dry the fibres at room temperature however this would involve longer time of minutes to tens of minutes. FIG. 20B shows the CNT cord successfully coated with latex rubber. The coating can be very well controlled by repeated immersion of the fibres and every immersion is capable of addition of the same amount of the coated layer.

The resistance of the fibre was measured before and after coating using a Keithley 2000 DC ohmmeter. No decrease in resistance was observed after application of the latex coating, indicating that no infiltration of latex into the fibre occurred. This is confirmed by the optical microscope images of FIG. 20A which shows the separation of the CNT fibre core and the latex coating. Due to the low viscosity of the latex suspension, the coating process is easy to perform and the thickness of the insulation can be controlled by changing the latex concentration in water.

The present inventors repeated this experiment for individual carbon nanotube fibres having a diameter of 10 μm and cords of carbon nanotube fibres having diameters in the range of 100 μm to 1 mm. The fibres were immersed in the suspension for 1 second, 10 seconds and 60 seconds. The thickness of the latex coating was found to be dependent on the time the fibres were immersed in the suspension and the number of times the immersion steps were repeated. For the immersion times of 1 second, 10 seconds and 60 seconds the thickness of the latex coating was found to be between 10 μm and 80 μm.

Comparative Example 3

Humidity Effects

In this Example CNT fibres were produced via direct spinning from floating catalyst chemical vapor deposition (CVD) reactor. Carbon nanotubes were synthesized using ferrocene, hydrocarbon source and sulfur compound decomposed in the hydrogen atmosphere and temperatures above 1000° C. The synthesized carbon nanotubes were directly spun into CNT fibres. CNT fibres are yarn-like assemblies of nanotubes of 10-20 μm in diameter and kilometer length. The fibres were condensed using acetone spray before collection [17].

The CNT fibre samples were placed in vacuum chamber and degassed at $10^{-3}$ Torr, which resulted in the increase of electrical resistance of the sample by 25%. Introduction of pure dry oxygen and other dry gases: $N_2$, $CO_2$, artificial air, and He into the vacuum chamber, directly above the sample, did not cause any difference in their resistance values. However addition of water vapor into any of these gases resulted in sudden decrease in electrical resistance. X-ray photoelectron spectroscopy confirmed the presence of oxygen and water in the as-made CNT fiber, while these species were absent from the sample annealed to 1000° C.

Figure 21:
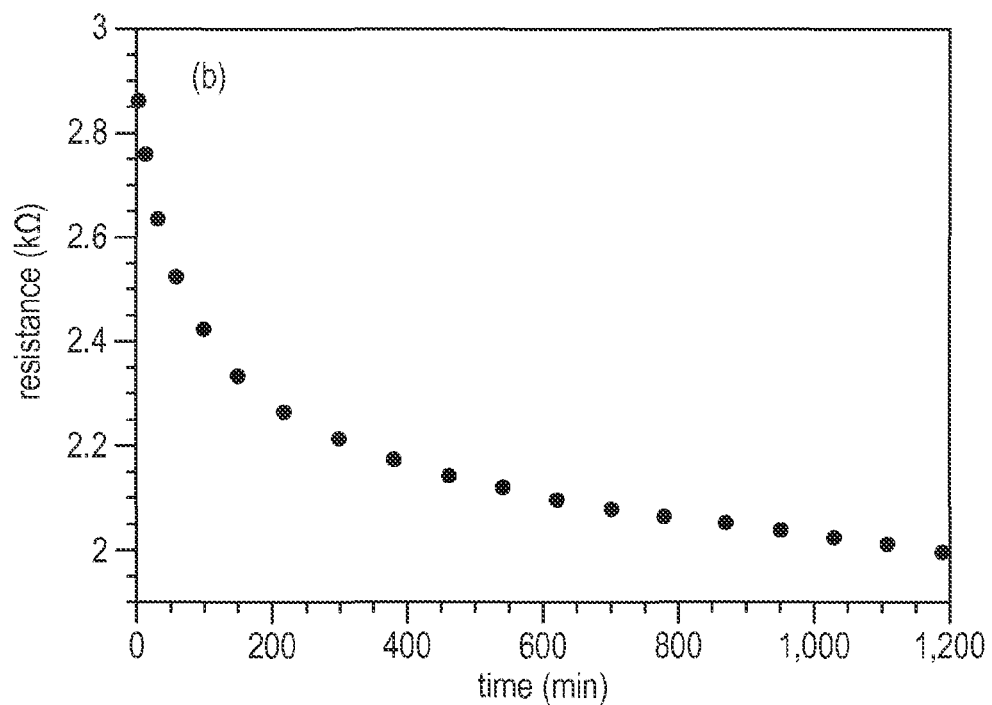
FIG. 21 shows the change in resistance over time for a CNT fibre sample prepared in Comparative Example 3.

Next, the fibre was annealed using DC current. The increase in temperature due to current flow resulted in a temporary rise in the resistance which was fully reversible upon the decrease of current and thus temperature as well as "permanent" change in resistance (resulting from desorption of water molecules) which required much longer time scale to allow the recovery of the initial conductivity of CNT fiber sample. FIG. 21 shows the recovery of the "permanent" change in resistance of the CNT fibre to the resistance of the fibre at ambient conditions (about 40% humidity). This change in resistance of the fibre over time at ambient conditions is due to adsorption of water molecules.

Comparative Example 4

Figure 22:
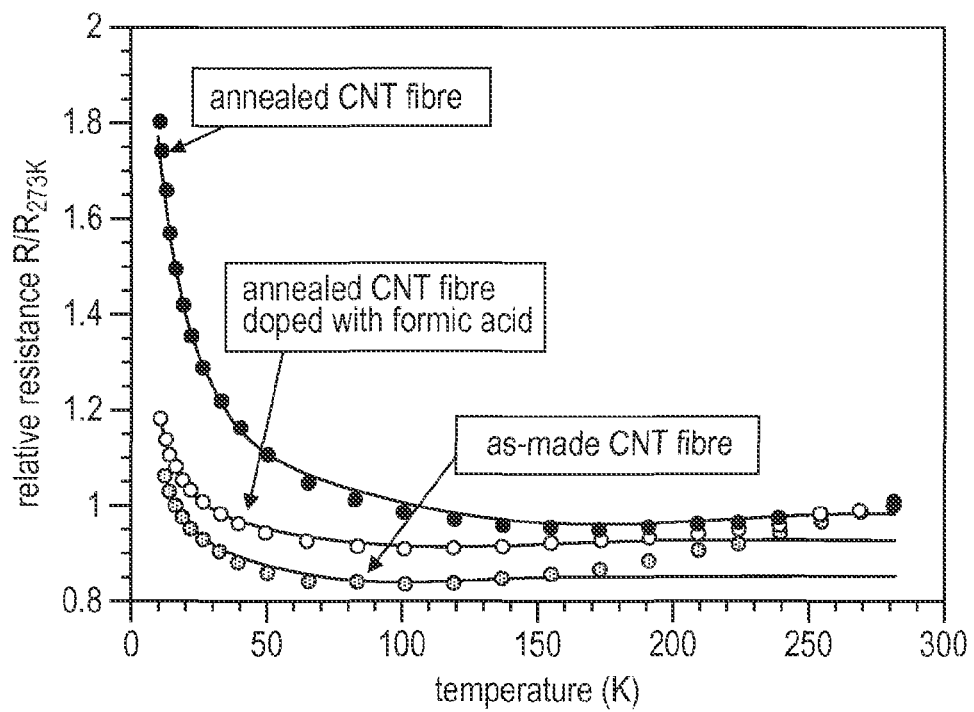
FIG. 22 shows relative changes of resistance and electrical behaviour as a function on temperature of an as-made CNT fibre, an annealed CNT fibre and an annealed CNT fibre doped with formic acid, from Comparative Example 4.

CNT fibres were prepared according to Comparative Example 3. The resistance of these fibres were measured at room temperature (650Ω), after annealing in argon at 770K (1330Ω) and after doping with formic acid (640Ω). The change in electrical resistance of the three types of carbon nanotube fibres were recorded in the temperature range from 273.15K to 10K. The relative changes in resistance are shown in FIG. 22. The upper line shows the annealed CNT fibre, the middle line the annealed CNT fibre doped with formic acid and the lower line the as-made fibre.

The characteristic features of resistance-temperature curves of CNT fibres measured in cryogenic temperatures can be seen in FIG. 22. The Curves shown in FIG. 22 all have an upturn point, defined by temperature $T_0$, below which the curve has a negative gradient (dR/dT<0), as is observed for semiconductors, and above which the curve has a positive gradient (dR/dT>0), as is observed for metals. From FIG. 22 it can be seen that the characteristic temperature $T_0$ for the as-made fibre sample is 97K, annealing increased $T_0$ to 170K and acid doping decreased it to 110K. The annealed fibre shows a large increase of resistance in the lowest temperatures i.e. 80% increase with regard to the resistance at $T_0$ point, while about 20% increase was observed in the curves of as-made fibre and acid doped fibre. This example clearly shows the presence of air adsorbates in the air-exposed CNT fibres, which clearly influence the electrical transport through CNT network.

This Comparative Example shows that ambient air (with typical relative humidity of 40%) also affects the dependence of resistance of CNT fibres on temperature. The similarity in the behavior of the CNT material with oxygen/water adsorbates (i.e. the fibres made at room temperature) and the acid doped fibre implies that air molecules, similarly to acids, introduce intrinsic changes into the CNTs which facilitate the conduction through the CNT network.

Example 7

PDMS Insulation

Figure 23:
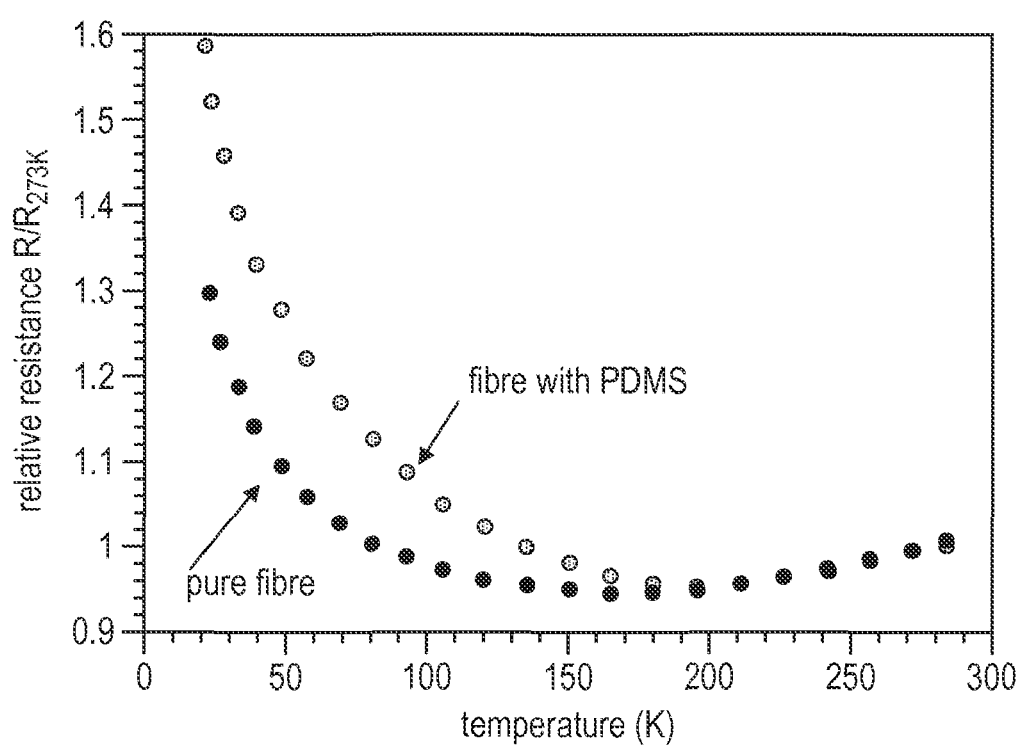
FIG. 23 shows relative changes of resistance and electrical behaviour as a function on temperature of an as-made and PDMS impregnated carbon nanotube sample of Example 7.

The electrical resistance changes of carbon nanotube fibres were recorded in the temperature range from 273.15K to 10K. The as-made fibre was reheated back to room temperature, then impregnated with PDMS and its resistance changes were recorded in the same temperature range from 273.15K to 10K. Relative changes of resistance are shown in FIG. 23. The upper line shows the fibre impregnated with PDMS, the lower line the as-made fibre. The difference between the change in resistance for the as-made fibre and the fibre impregnated with PDMS is much less than for the as-made fibre and the fibre impregnated with PEG (shown in FIG. 1).

Comparing FIG. 1 and FIG. 23 shows that PEG has a much stronger effect on electrical conductivity that PDMS i.e. infiltration with PEG causes a greater increase in resistance of the fibres than infiltration with PDMS. The present inventors have found that polyethylene glycol increases the resistivity of the fibre not only due to the viscosity effects and infiltration of the CNT network with insulating molecules, but additionally due to the hygroscopic properties of PEG. This means that PEG present in the fibre will cause desorption of naturally adsorbed water molecules. As discussed in comparative Example 3 above, adsorbed water molecules play a role in the electrical conduction of the CNT networks, in particular it reduces the resistance of the fibres at room temperature.

Additionally, the adsorption of water molecules changes the characteristic low temperature behaviour of CNT fibres as discussed above in Comparative Example 4. By comparing low temperature behaviour of a pure fibre and fibre infiltrated with PDMS (FIG. 23) and a pure fibre and fibre infiltrated with polyethylene glycol (FIG. 1) it can clearly be see that the effect of PEG is a combination of the effects of infiltration with insulating molecules and removal of water molecules as the effect of PEG on the upturn temperature and gradient of increase in semiconducting part of the curve is clearly a superposition of these both factors.

A further advantage of providing a carbon nanotube and/or graphene nanoribbon fibre with polymer insulation is that in applications of these fibres that are concerned with the influence of ambient conditions the polymer insulation may provide a simple and efficient cover against, for example, adsorption of water molecules.

The preferred embodiments have been described be way of example only. Modifications to these embodiments, further embodiments and modifications will be apparent to the skilled person and as such are within the scope of the present invention.

REFERENCES

1. Noorden R.: The Trials of New Carbon, Nature, vol. 469, pp. 14-16, 2011,
2. Patel-Predd P.: Carbon-nanotube wiring gets real, IEEE Spectr., vol. 45, no. 4, p. 14, 2008,
3. Hikata T.: Development of New Carbon Nanotube Production Technique Carbon Transmission Method, SEI Technical Review, Number 66, pp. 81-84, 2008,
4. Elcock, D.: Potential Impacts of Nanotechnology on Energy Transmission Applications and Needs, ANL/EVS/TM/08-3, prepared by Enviromental Science Division, Argonne National Laboratory, 2007,
5. Collins P.: Nanotubes for Electronics, Scientific American, pp. 62-69, 2000,
6. Koziol K.: High-Performance Carbon Nanotube Fiber, Science, Vol. 318 no. 5858 pp. 1892-1895, 2007,
7. Popov V.: Carbon nanotubes: properties and application, Materials Science and Engineering, R 43, pp. 61-102, 2004,
8. Dresselhaus M.: Electronic, thermal and mechanical properties of carbon nanotubes, Phil. Trans. R. Soc. Lond. A 362, pp. 2065-2098, 2004,
9. http://www.clearcoproducts.com/pdf/library/Polydimethylsiloxanes1.pdf accessed on 22 Aug. 2011
10. Martienssen, Werner; Warlimont, Hans (Eds.) "Springer Handbook of Condensed Matter and Materials Data"2005, XVIII, 1120
11. ThorbjörnAndersson, BengtWesslén, DEGRADATION OF LDPE LLDPE AND HDPE IN FILM EXTRUSION, 2003 European PLACE Conference Proceedings
12. R. M. Sundaram, K. K. Koziol and A. H. Windle, *Adv. Mat.*, 2011, 23, 5064
13. Preferential Growth of Single-Walled Carbon Nanotubes with Metallic Conductivity, Avetik R. Harutyunyan, Gugang Chen, Tereza M. Paronyan, Elena M. Pigos, Oleg A. Kuznetsov, Kapila Hewaparakrama, Seung Min Kim Dmitri Zakharov, Eric A. Stach, and Gamini U. Sumanasekera, *Science*, 2009, 326, 116-120
14. Materials Science: Spinning Yarns of nanotubes, Nature 469 135 (DOI:10.1038/469135b)
15. Lima et al, "Biscrolling Nanotube Sheets and Functional Guests into Yarns", *Science* 331 no. 6013 pp. 51-55 (DOI 10.1126/science.1195912)
16. Xu et al, "Graphene chiral liquid crystals and macroscopic assembled fibres", *Nature Communications*, (2:571|DOI: 10.1038/ncomms1583)
17. K. Koziol, J. Vilatela, A. Moisala, M. Motta, P. Cunniff, M. Sennett, and A. Windle, *Science,* 2007, 318, 1892

The invention claimed is:

1. An electrical conductor comprising:
    an electrically conducting fibre comprising carbon nanotubes and/or graphene nanoribbon; and
    a layer of insulating material coated around the electrically conducting fibre, wherein the layer of insulating material is in direct contact with the carbon nanotubes and/or the graphene nanoribbon of the electrically conducting fibre, and wherein the insulating material substantially does not penetrate the electrically conducting fibre, or penetrates the electrically conducting fibre only to a depth that leaves a continuous conductive path along a remaining part of the electrically conducting fibre.

2. The electrical conductor according to claim 1 wherein the electrically conducting fibre comprises at least 75% by weight of carbon nanotubes.

3. The electrical conductor according to claim 1 wherein the insulating material substantially does not penetrate the electrically conducting fibre, or penetrates the electrically conducting fibre only to a depth of not more than 10% of the radius of the fibre.

4. The electrical conductor according to claim 1 wherein the electrically conducting fibre has a diameter of 10 mm or less.

5. The electrical conductor according to claim 1 wherein the electrically conducting fibre has a diameter of 1 mm or less.

6. The electrical conductor according to claim 1 wherein the insulating material substantially does not penetrate the electrically conducting fibre, or penetrates the electrically conducting fibre only to a depth of not more than 5 µm from the surface of the fibre.

7. The electrical conductor according to claim 1 wherein the insulating material comprises a polymer, such as a rubber polymer or low density polyethylene.

8. The electrical conductor according to claim 1 wherein the insulating material comprises a curable silicone polymer, or a siloxane polymer such as polydimethyl siloxane (PDMS).

9. The electrical conductor according to claim 1 having a conductivity of at least $0.7 \times 10^6$ $Sm^{-1}$.

10. An electrical or electronic device comprising one or more electrical conductors comprising:
    an electrically conducting fibre comprising carbon nanotubes and/or graphene nanoribbon; and
    a layer of insulating material coated around the electrically conducting fibre, wherein the layer of insulating material is in direct contact with the carbon nanotubes and/or the graphene nanoribbon of the electrically conducting fibre, and wherein the insulating material substantially does not penetrate the electrically conducting fibre, or penetrates the electrically conducting fibre only to a depth that leaves a continuous conductive path along a remaining part of the electrically conducting fibre.

11. The electrical or electronic device according to claim 10 which comprises an electromagnet, and wherein said one or more electrical conductors is used to provide current carrying windings for the electromagnet.

12. A method of coating an electrically conducting fibre comprising carbon nanotubes and/or graphene nanoribbon, the method comprising
    (i) applying flowable insulating material to the electrically conducting fibre to be in direct contact with the carbon nanotubes and/or the graphene nanoribbon of the electrically conducting fibre; and
    (ii) solidifying said insulating material on the surface of the electrically conducting fibre to coat the fibre with a layer of insulating material, so that the layer of insulating material is in direct contact with carbon nanotubes and/or graphene nanoribbon of the electrically conducting fibre, wherein the insulating material substantially does not penetrate the electrically conducting fibre, or penetrates the electrically conducting fibre only to a depth that leaves a continuous conductive path along a remaining part of the electrically conducting fibre.

13. The method according to claim 12 wherein the viscosity of the flowable insulating material during the application step is adjusted so that the insulating material substantially does not penetrate the electrically conducting fibre, or penetrates the electrically conducting fibre only to a depth that leaves a continuous conductive path along a remaining part of the electrically conducting fibre.

14. The method according to claim 12 wherein during the application step, the flowable insulating material has a dynamic viscosity of at least 200 cP.

15. The method according to claim 12 wherein the flowable insulating material is a molten polymer, and wherein the polymer comprises low density polyethylene, a curable silicone polymer, or a siloxane polymer such as polydimethyl siloxane (PDMS).

16. The method according to claim 12 wherein the flowable insulating material is applied to the fibre from an emulsion of insulating material in water.

17. The method according to claim 16 wherein the emulsion is an emulsion of latex and water.

18. The method according to claim 12 wherein the length of time the fibre is exposed to the flowable insulating material before solidification is adjusted so that the insulating material substantially does not penetrate the fibre, or penetrates the fibre only to a depth that leaves a continuous conductive path along a remaining part of the electrically conducting fibre.

19. The method according to claim 12, wherein the fibre is exposed to the flowable insulating material before solidification for a period of 5 minutes or less.

20. The method according to claim 12 wherein
    the electrically conducting fibre has a resistance $R_0$ before exposure to the flowable insulating material,
    and a resistance of R after solidification of the insulating material, and wherein the ratio $R/R_0$ is 1.1 or less.

* * * * *